(12) United States Patent
Kim et al.

(10) Patent No.: US 11,861,112 B2
(45) Date of Patent: Jan. 2, 2024

(54) TOUCH SENSOR PANEL

(71) Applicant: HiDeep Inc., Seongnam-si (KR)

(72) Inventors: Seyeob Kim, Seongnam-si (KR);
Bonkee Kim, Seongnam-si (KR);
Jongsik Kim, Seongnam-si (KR)

(73) Assignee: HiDeep Inc.

( * ) Notice: Subject to any disclaimer, the term of this patent is extended or adjusted under 35 U.S.C. 154(b) by 159 days.

(21) Appl. No.: 17/442,742

(22) PCT Filed: Feb. 11, 2020

(86) PCT No.: PCT/KR2020/001924
§ 371 (c)(1),
(2) Date: May 19, 2022

(87) PCT Pub. No.: WO2020/197088
PCT Pub. Date: Oct. 1, 2020

(65) Prior Publication Data
US 2022/0276761 A1    Sep. 1, 2022

(30) Foreign Application Priority Data
Mar. 26, 2019  (KR) .......................... 10-2019-0034236

(51) Int. Cl.
*G06F 3/041*    (2006.01)
*G06F 3/044*    (2006.01)

(52) U.S. Cl.
CPC ........ *G06F 3/04186* (2019.05); *G06F 3/0443* (2019.05); *G06F 3/0446* (2019.05)

(58) Field of Classification Search
CPC .. G06F 3/04186; G06F 3/0443; G06F 3/0446; G06F 3/04166; G06F 3/0445;
(Continued)

(56) References Cited

U.S. PATENT DOCUMENTS 9,081,453 B2 *  7/2015  Bulea ....................... G06F 3/041
9,927,832 B2 *  3/2018  Tanemura ............. G06F 3/0443
(Continued)

FOREIGN PATENT DOCUMENTS

KR   1020080081411 A   9/2008
KR   1020130006296 A   1/2013
(Continued)

OTHER PUBLICATIONS

International Search Report from PCT/KR2020/001924, dated Sep. 4, 2020, pp. 1-5, including English translation.

*Primary Examiner* — Ibrahim A Khan
(74) *Attorney, Agent, or Firm* — The Belles Group, P.C.

(57) ABSTRACT

A touch sensor panel according to an exemplary embodiment of the present invention is a touch sensor panel in which a plurality of driving electrodes and a plurality of receiving electrodes are arranged on the same layer, in which the plurality of receiving electrodes is arranged along a plurality of rows and columns, the plurality of driving electrodes is arranged such that at least one driving electrode is disposed at each of both sides with respect to each receiving electrode, and the driving electrode arranged at the left side and the driving electrode arranged at the right side with the receiving electrode interposed therebetween are electrically connected with each other.

13 Claims, 29 Drawing Sheets

(58) Field of Classification Search
CPC ............ G06F 3/0412; G06F 3/041662; G06F 2203/04111; G06F 3/04164; G06F 3/0418
See application file for complete search history.

(56) References Cited

U.S. PATENT DOCUMENTS

| | | | |
|---|---|---|---|
| 10,312,297 B2* | 6/2019 | Lee | G06F 3/0412 |
| 2010/0090979 A1 | 4/2010 | Bae | |
| 2011/0048812 A1* | 3/2011 | Yilmaz | G06F 3/04164 |
| | | | 178/18.06 |
| 2011/0148435 A1* | 6/2011 | Schwartz | G01R 27/2605 |
| | | | 324/658 |
| 2012/0162094 A1* | 6/2012 | Kent | G06F 3/0447 |
| | | | 345/173 |
| 2013/0181942 A1 | 7/2013 | Bulea et al. | |
| 2013/0181943 A1* | 7/2013 | Bulea | G06F 3/041 |
| | | | 345/174 |
| 2013/0277091 A1* | 10/2013 | Chang | H05K 1/0296 |
| | | | 174/250 |
| 2014/0152621 A1* | 6/2014 | Okayama | G06F 3/04182 |
| | | | 345/174 |
| 2014/0210784 A1* | 7/2014 | Gourevitch | G06F 3/0443 |
| | | | 345/174 |
| 2014/0267137 A1* | 9/2014 | Solven | G06F 3/0443 |
| | | | 345/174 |
| 2015/0116254 A1* | 4/2015 | Solven | G06F 3/0443 |
| | | | 345/174 |
| 2016/0117044 A1* | 4/2016 | Weng | G06F 3/04166 |
| | | | 345/174 |
| 2017/0060329 A1* | 3/2017 | Yoon | G06F 3/0447 |
| 2017/0160833 A1 | 6/2017 | Han | |
| 2018/0097038 A1* | 4/2018 | Lee | G06F 3/0412 |
| 2018/0224964 A1* | 8/2018 | Church | G06F 3/047 |
| 2018/0364826 A1* | 12/2018 | Kim | G06F 3/0445 |

FOREIGN PATENT DOCUMENTS

| | | | | |
|---|---|---|---|---|
| KR | 101294341 B1 | 8/2013 | | |
| KR | 1020150031767 A | 3/2015 | | |
| KR | 1020150114405 A | 10/2015 | | |
| KR | 20160043583 A | * 4/2016 | ............ | G06F 3/041 |
| KR | 101651408 B1 | 8/2016 | | |

* cited by examiner

[Figure 1a]
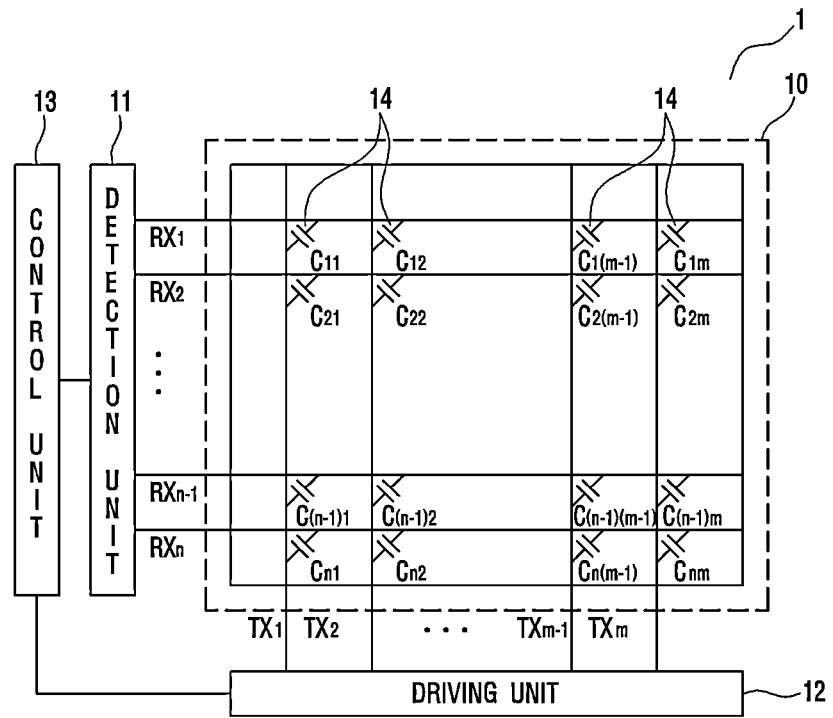
[Figure 1b]
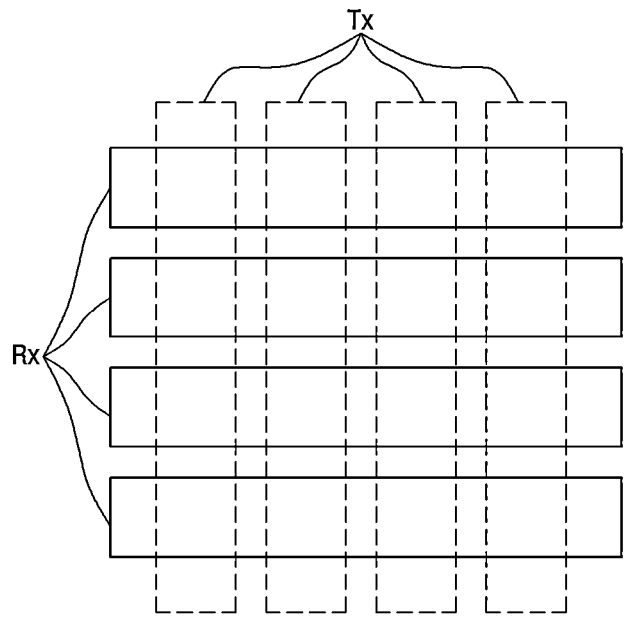

[Figure 1c]
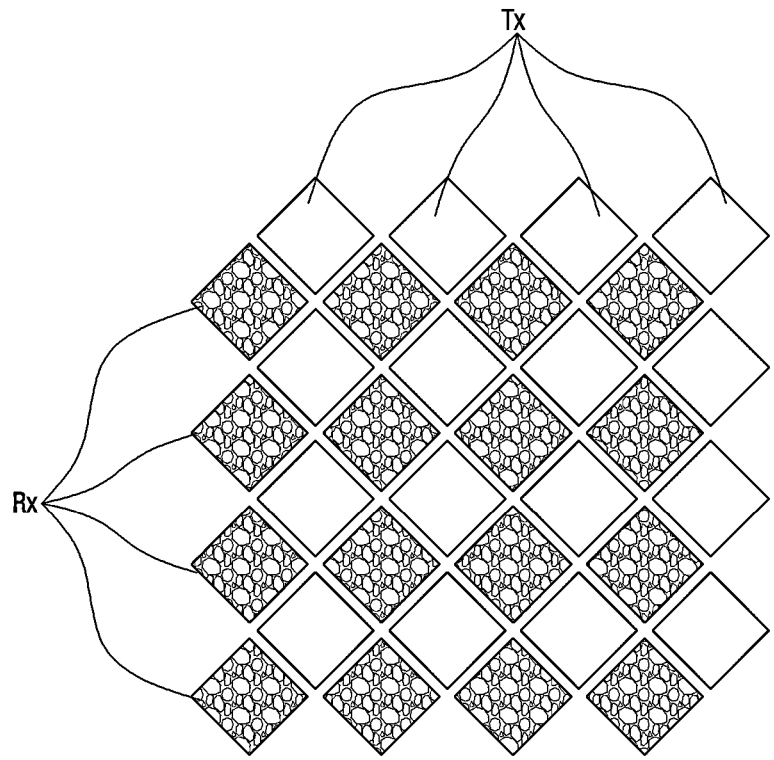
[Figure 1d]
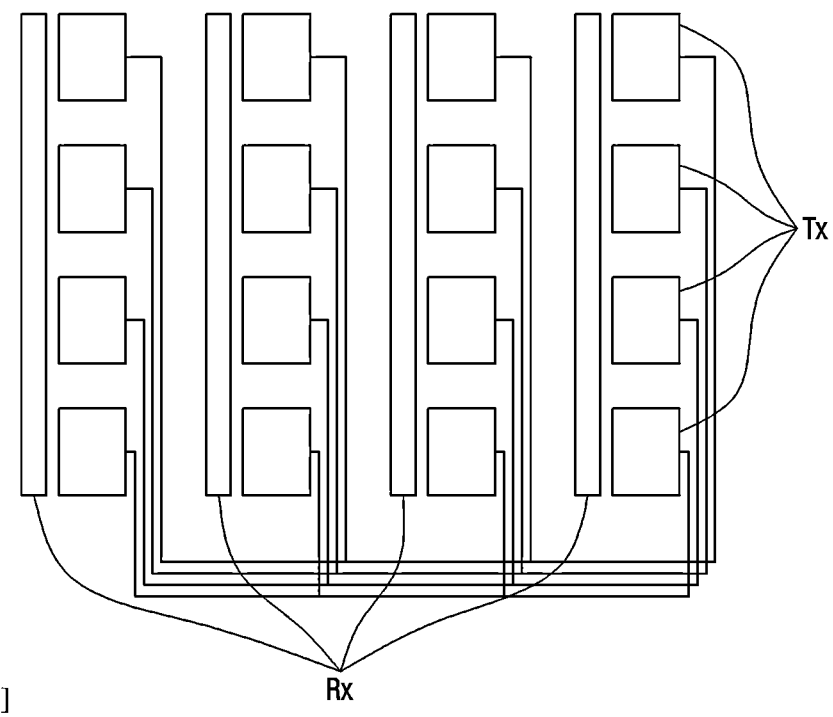

[Figure 2]
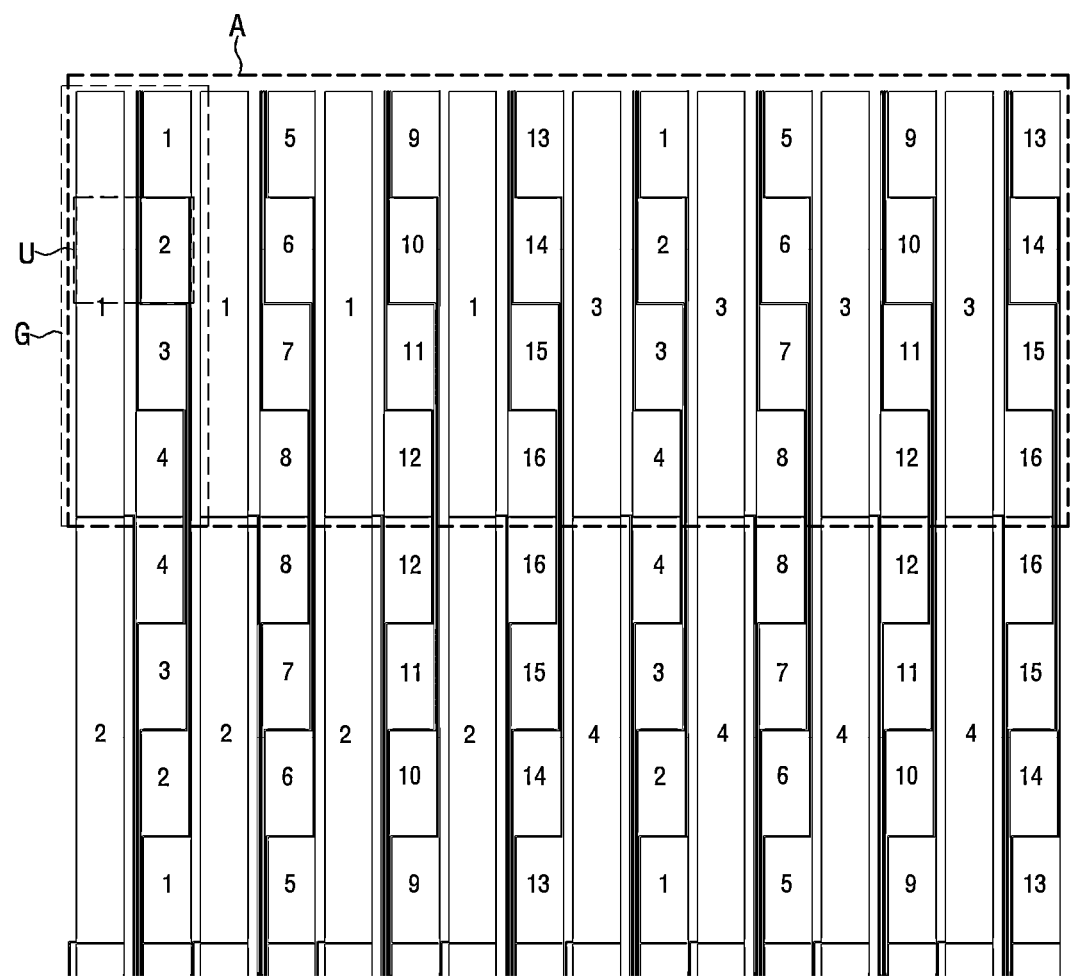

[Figure 3]
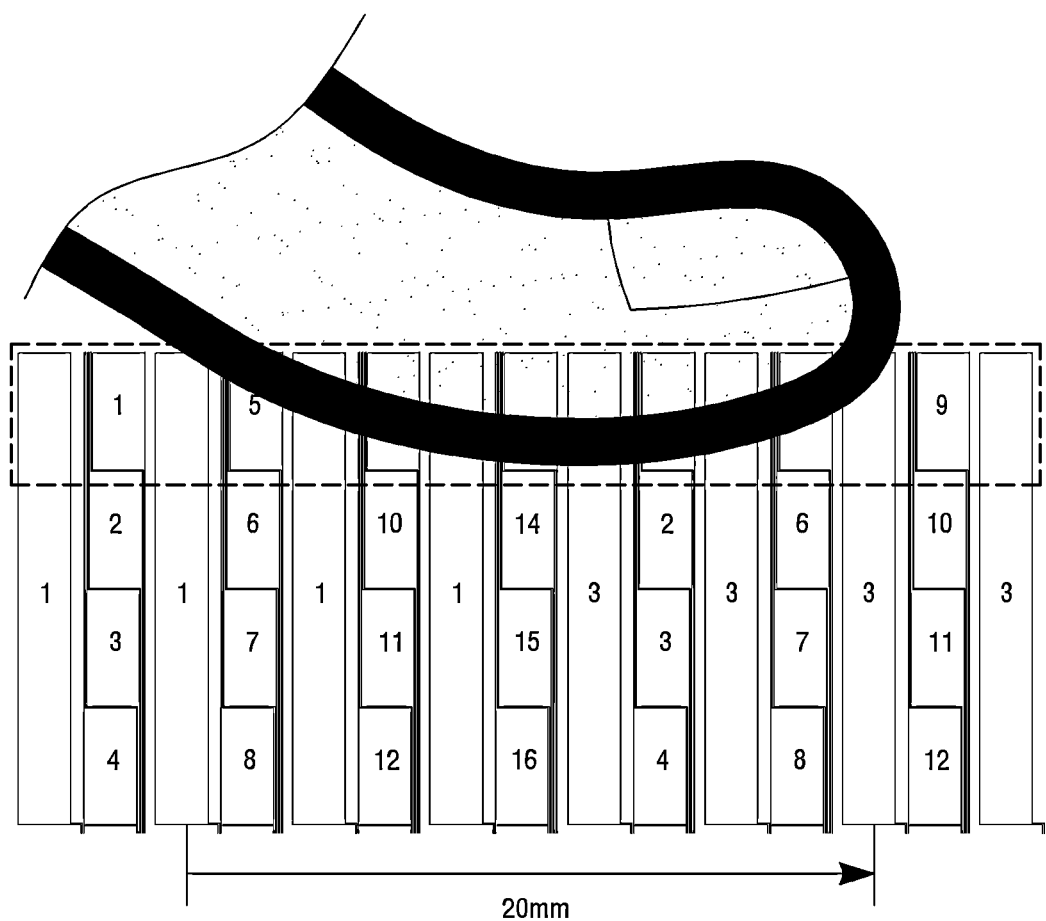

[Figure 4]
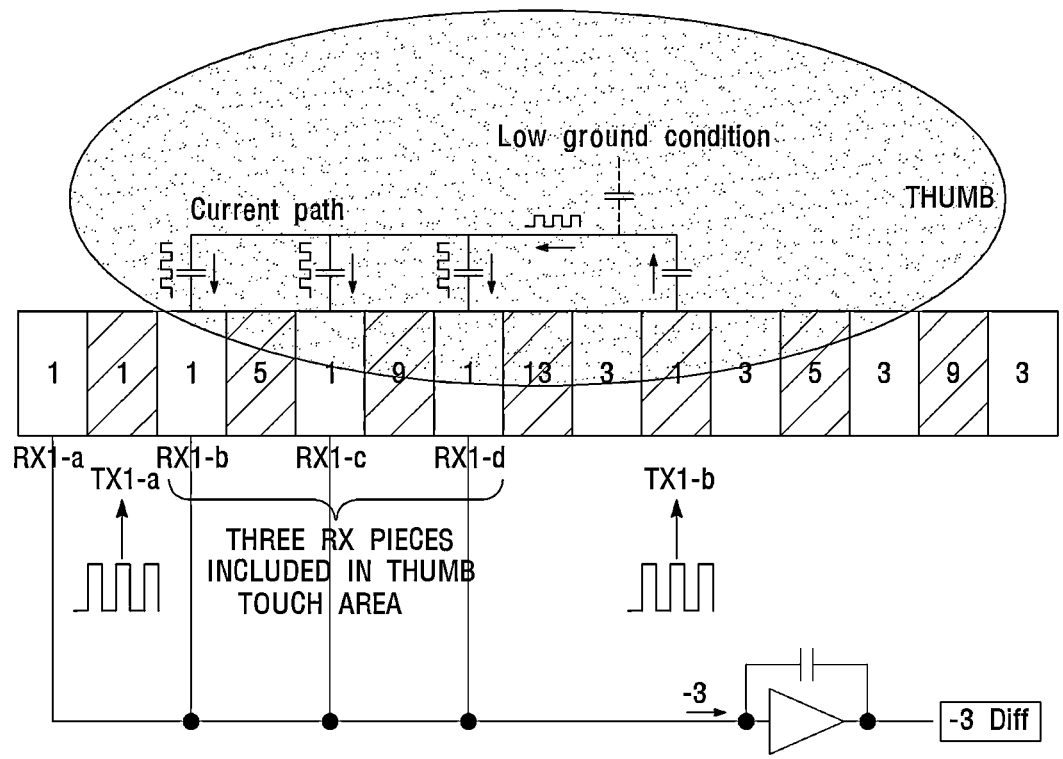

[Figure 5]
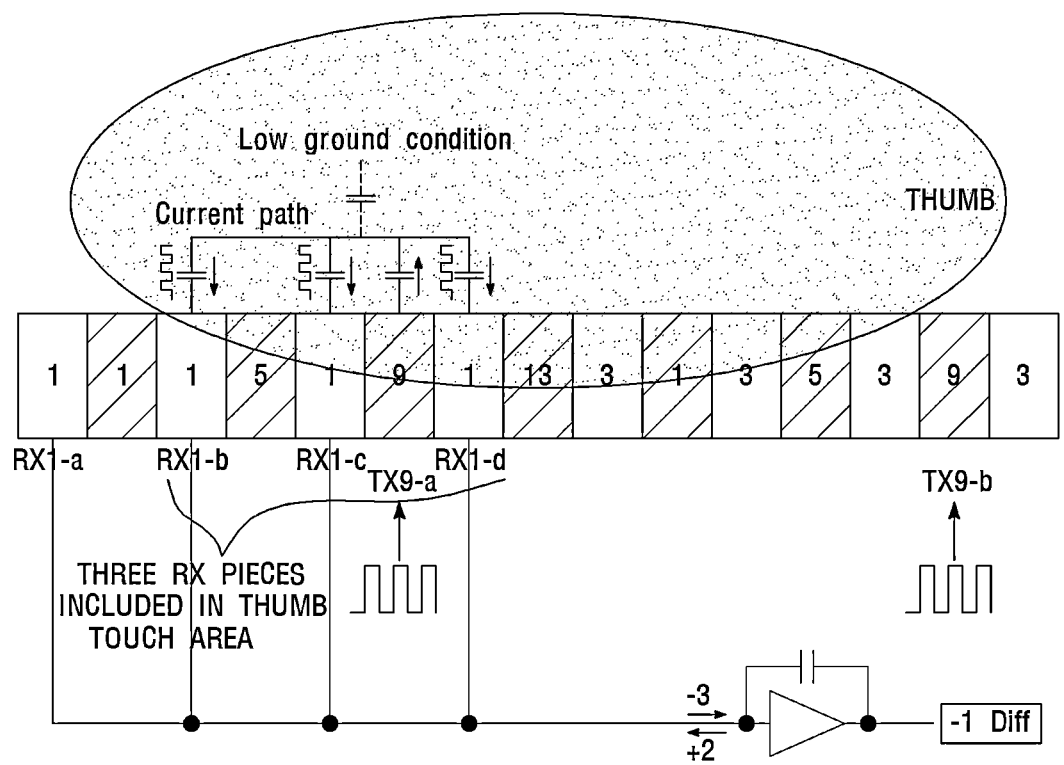

[Figure 6]
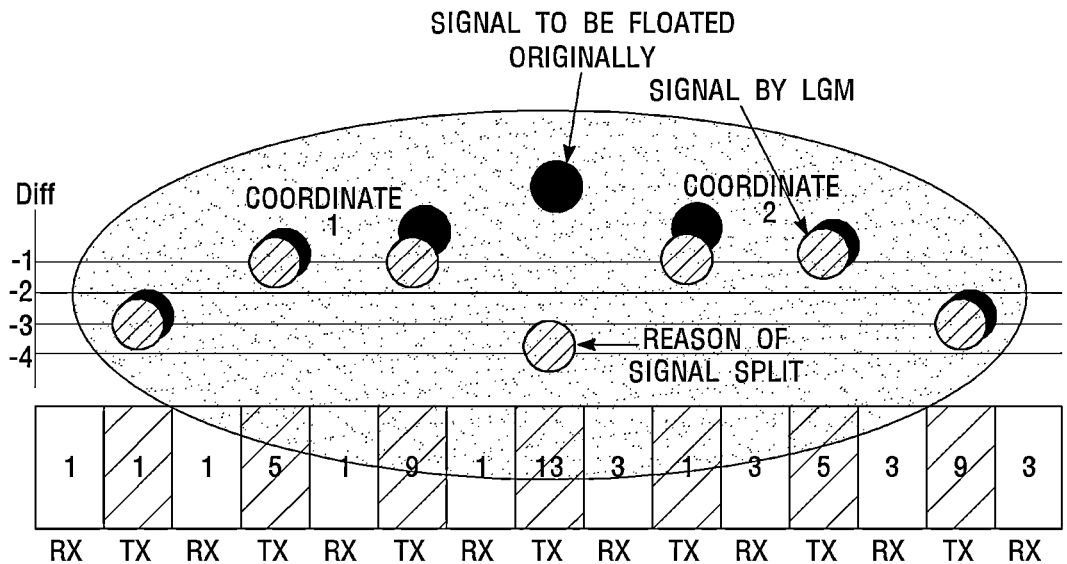

[Figure 7]
| NUMBER OF NORMAL TOUCH SIGNALS | 0 | 2 | 2 | 2 | 2 | 2 | 0 | |
|---|---|---|---|---|---|---|---|---|
| NUMBER OF LGMS | 3 | 3 | 3 | 6 | 3 | 3 | 3 | |
| Floating Diff | -196 | -109 | 365 | 159 | 308 | 214 | -226 | ←MEASUREMENT VALUE |
| CALCULATE LGM SIGNAL | -196/3 =-65 | | | | | | -226/3 =75 | |
| LGM COMPENSATION VALUE CALCULATION | -196+ 3*65 =0 | -106+ 3*65 =102 | 365+ 3*65 =576 | 159+ 3*65+ 3*75 =581 | 308+ 3*75 =519 | 214+ 3*75 =425 | -226+ 3*75 =0 | |
| LGM COMPENSATION VALUE | 0 | 102 | 576 | 581 | 519 | 425 | 0 | ←CALCULATION VALUE |
| VALUE TO BE OUTPUT ORIGINALLY | -11 | 27 | 491 | 645 | 602 | 464 | 23 | ←MEASUREMENT VALUE |
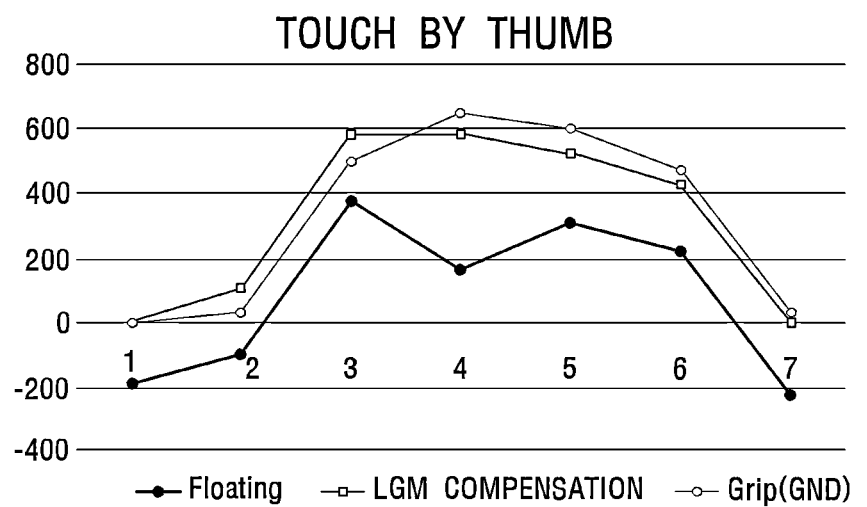

[Figure 8a]
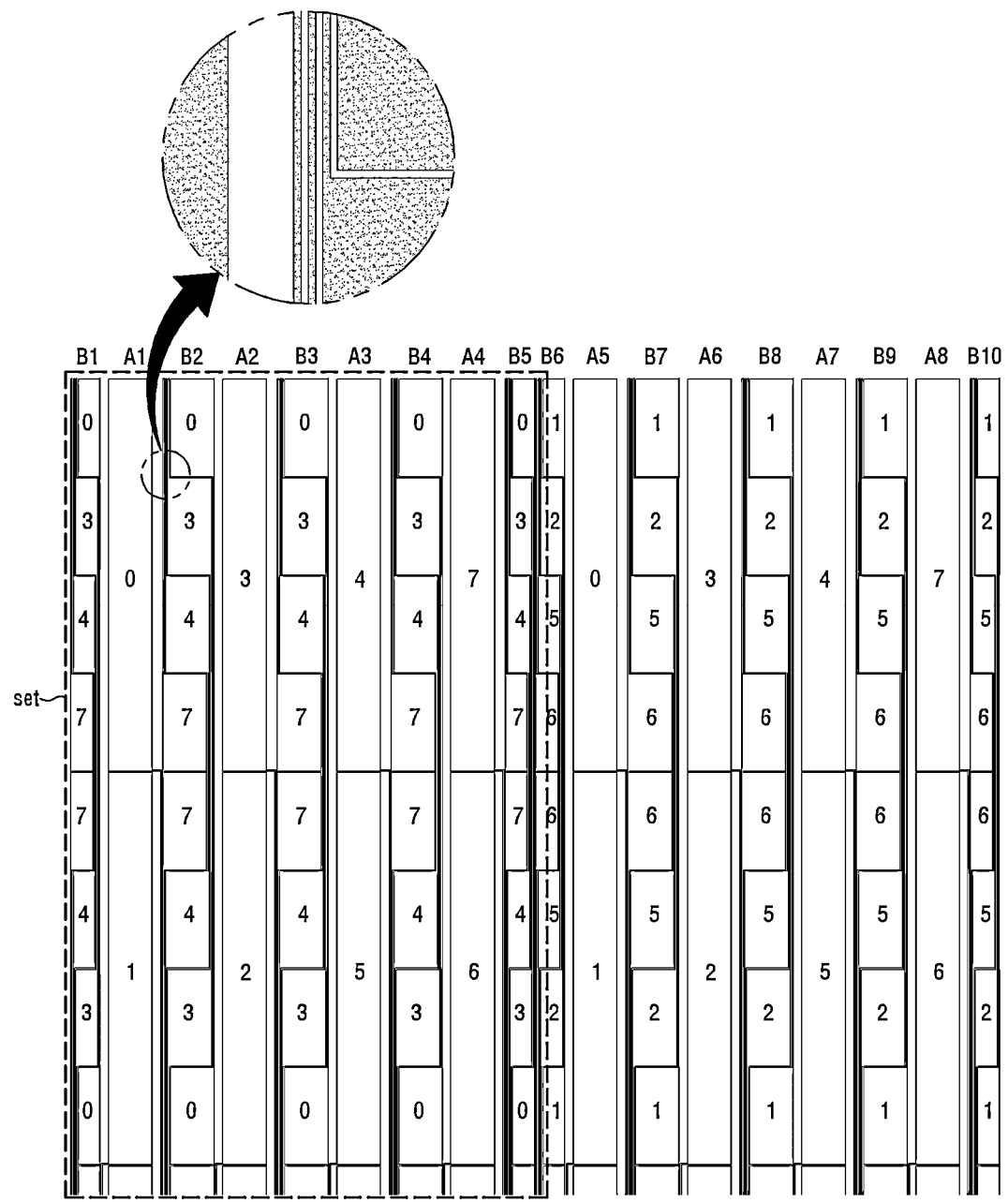

[Figure 8b]
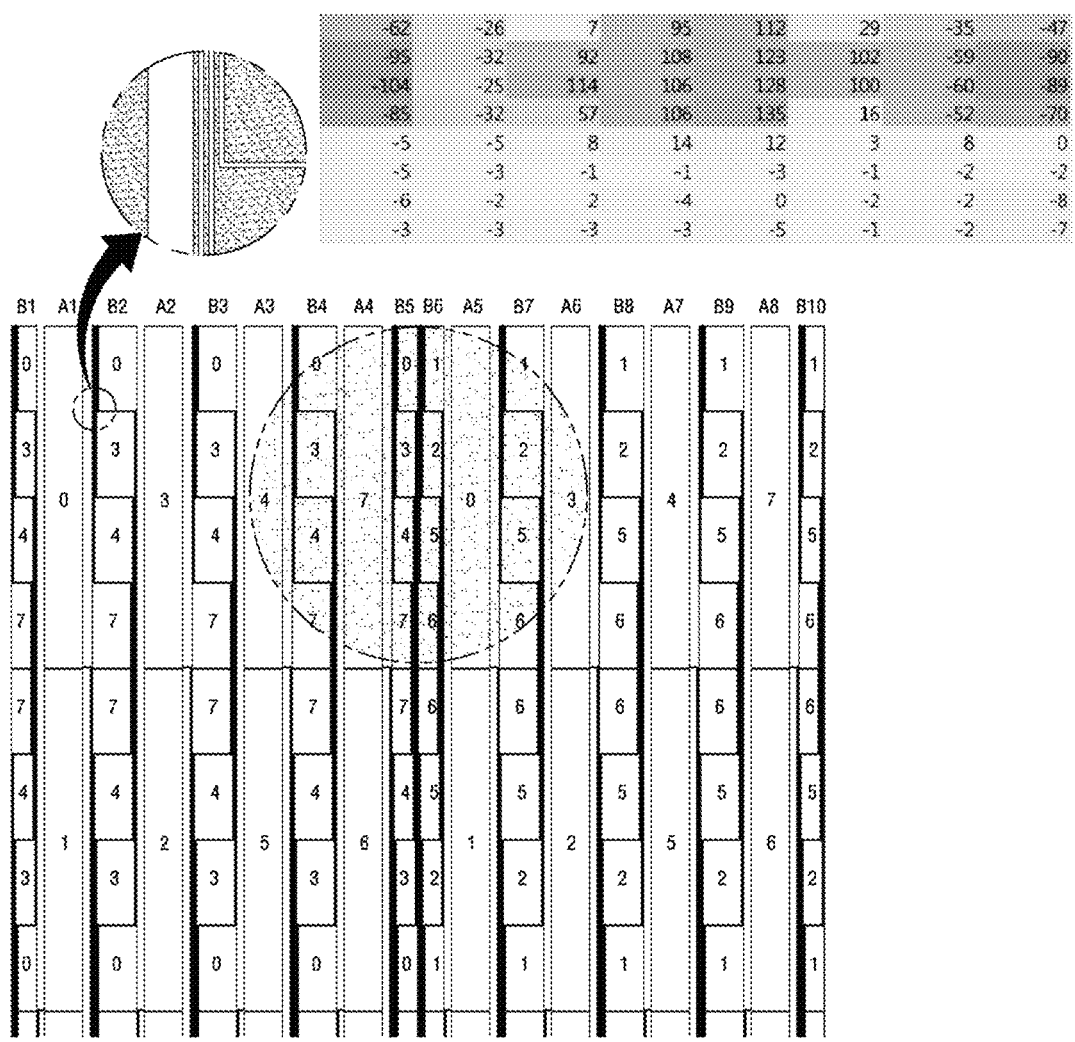

[Figure 9a]
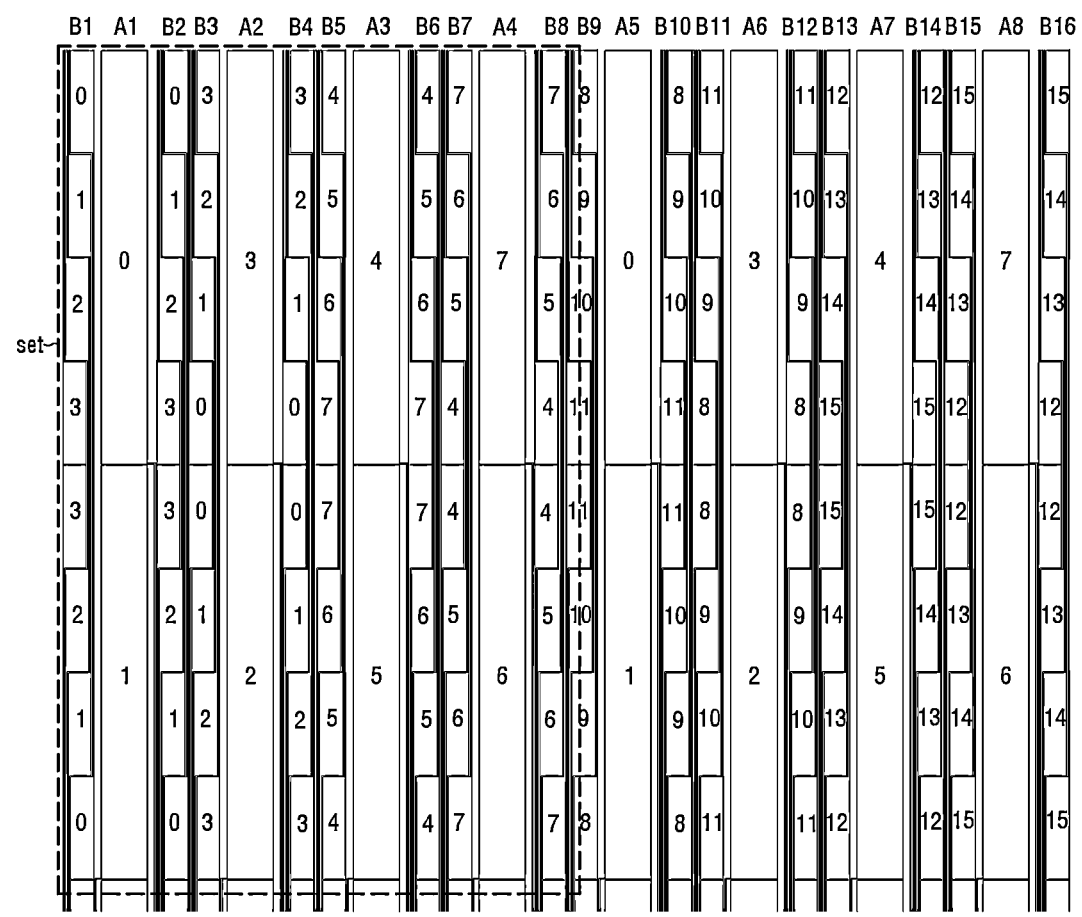

[Figure 9b]

[Figure 10a]
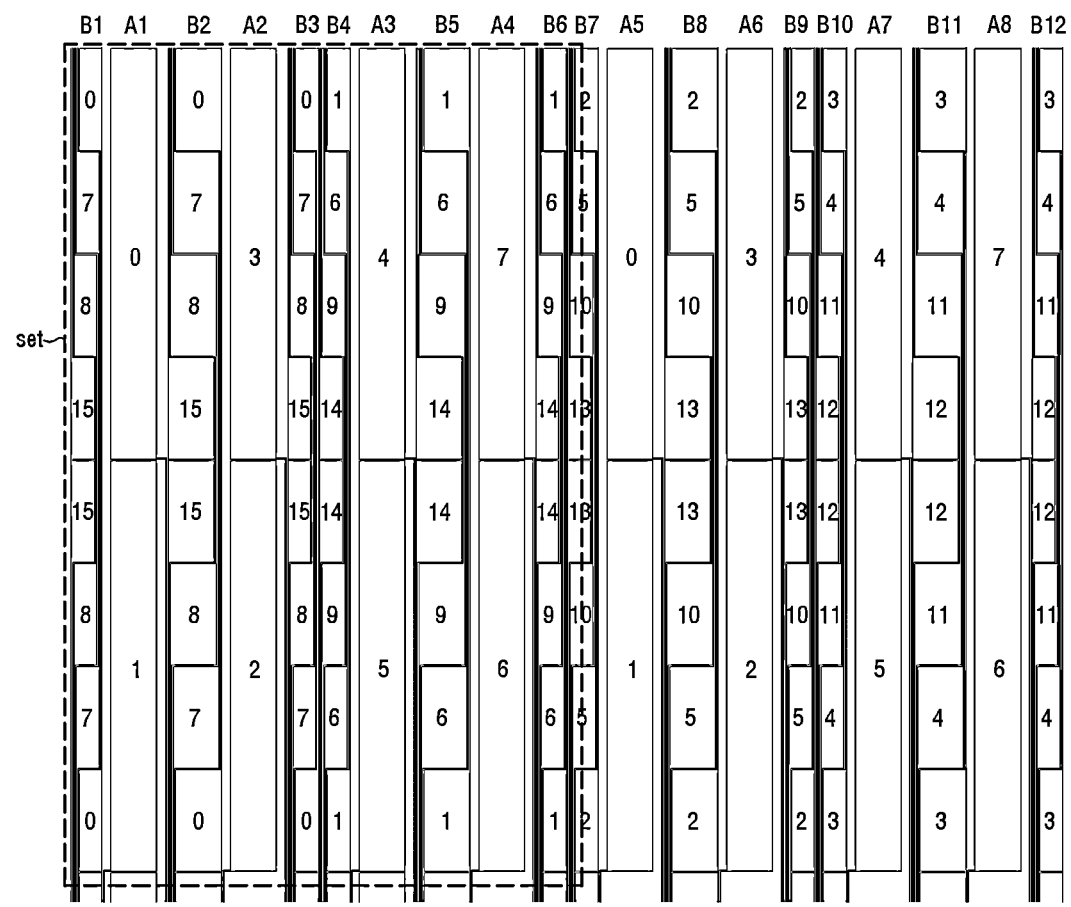

[Figure 10b]
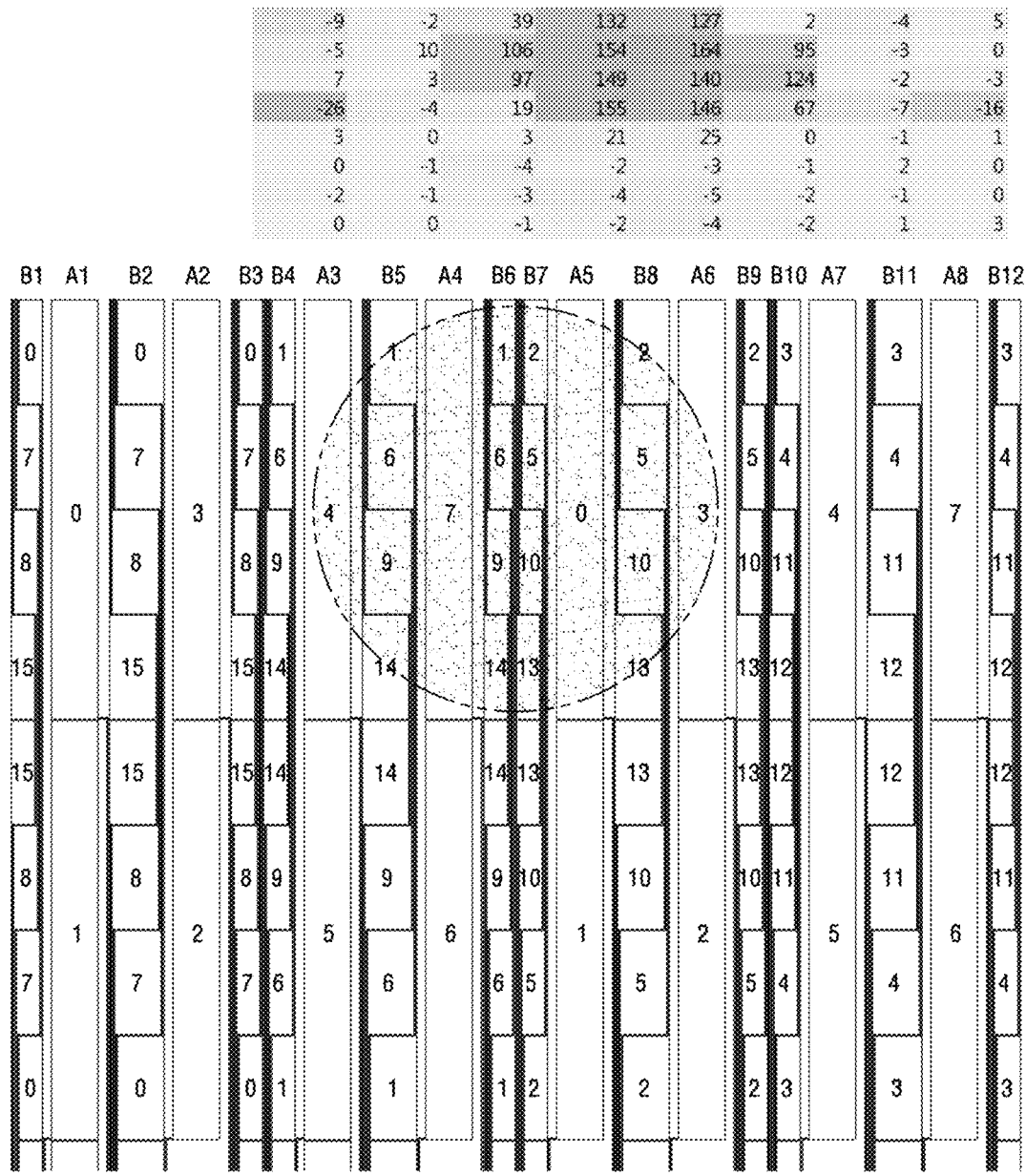

[Figure 13b]
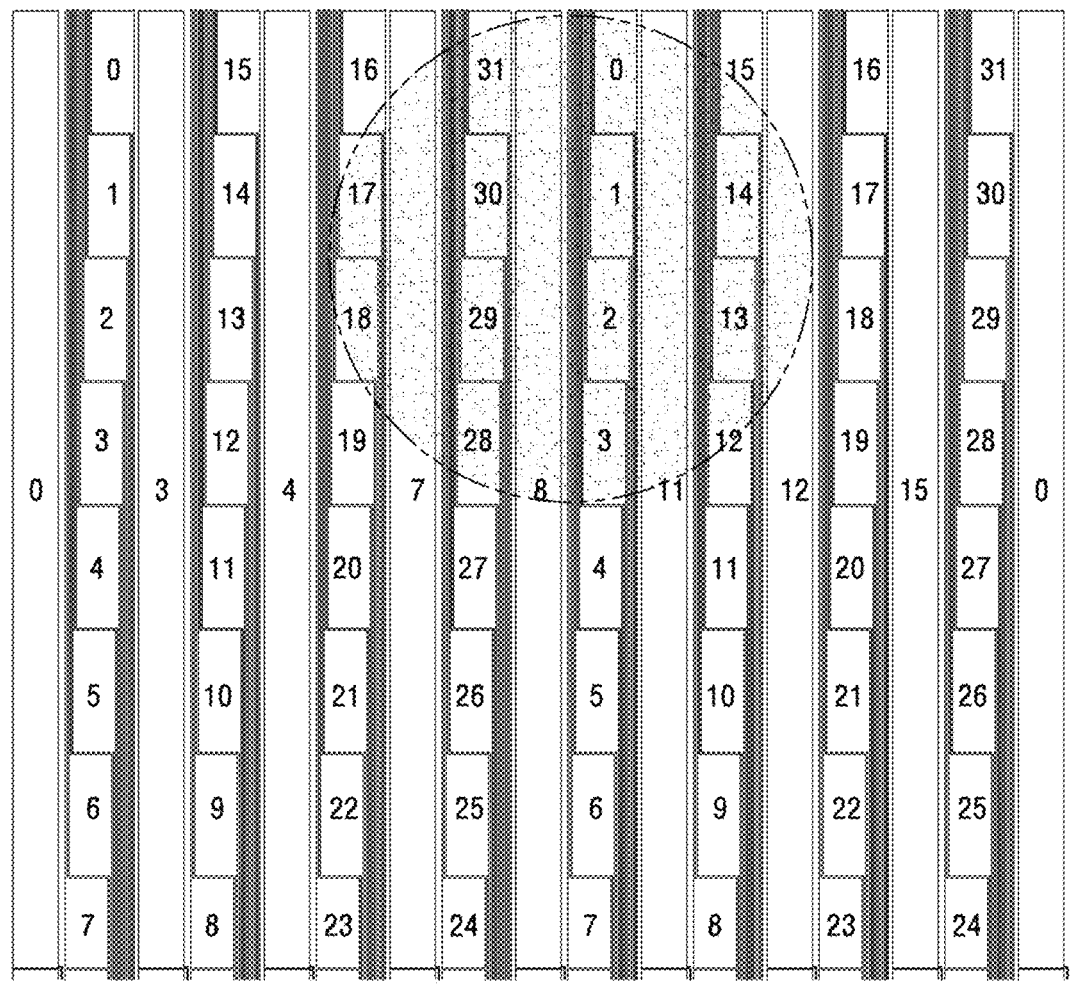

[Figure 14b]
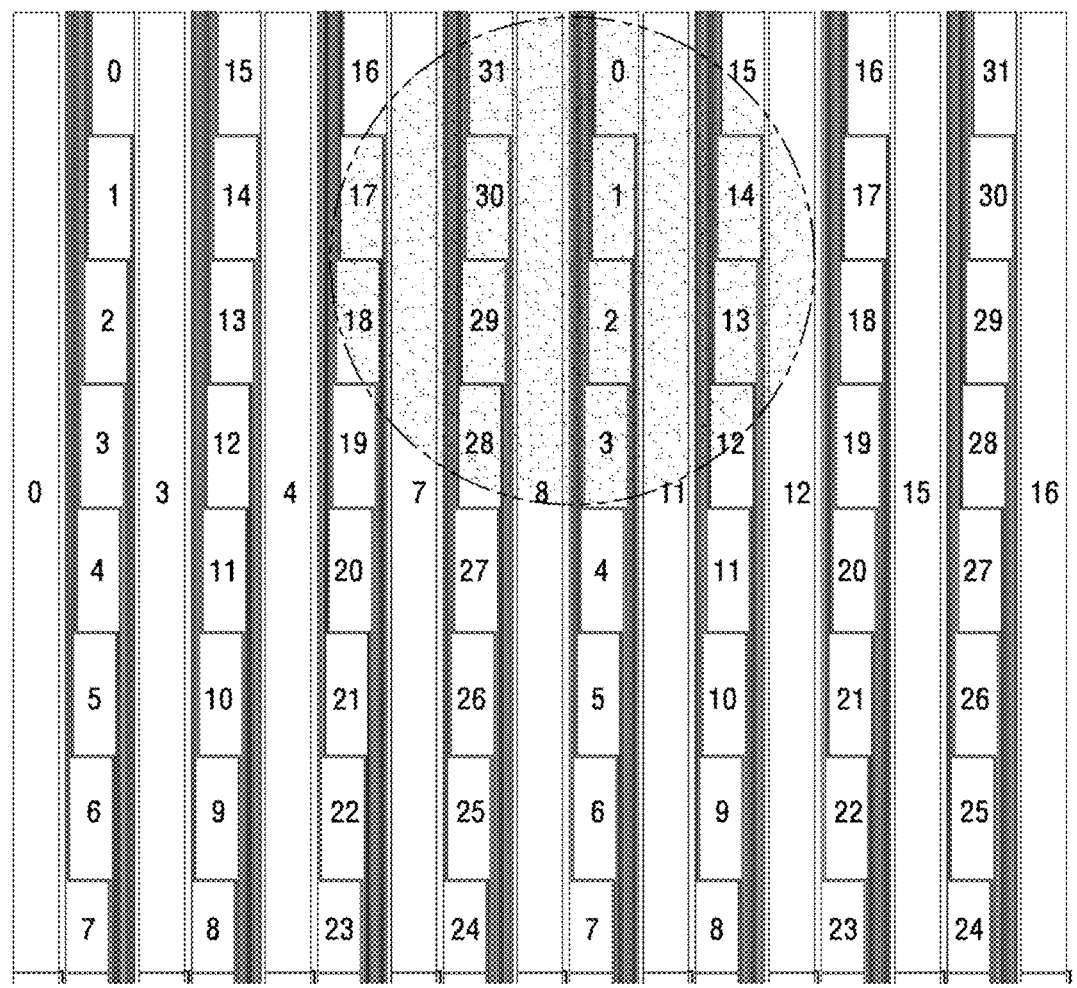

[Figure 16]
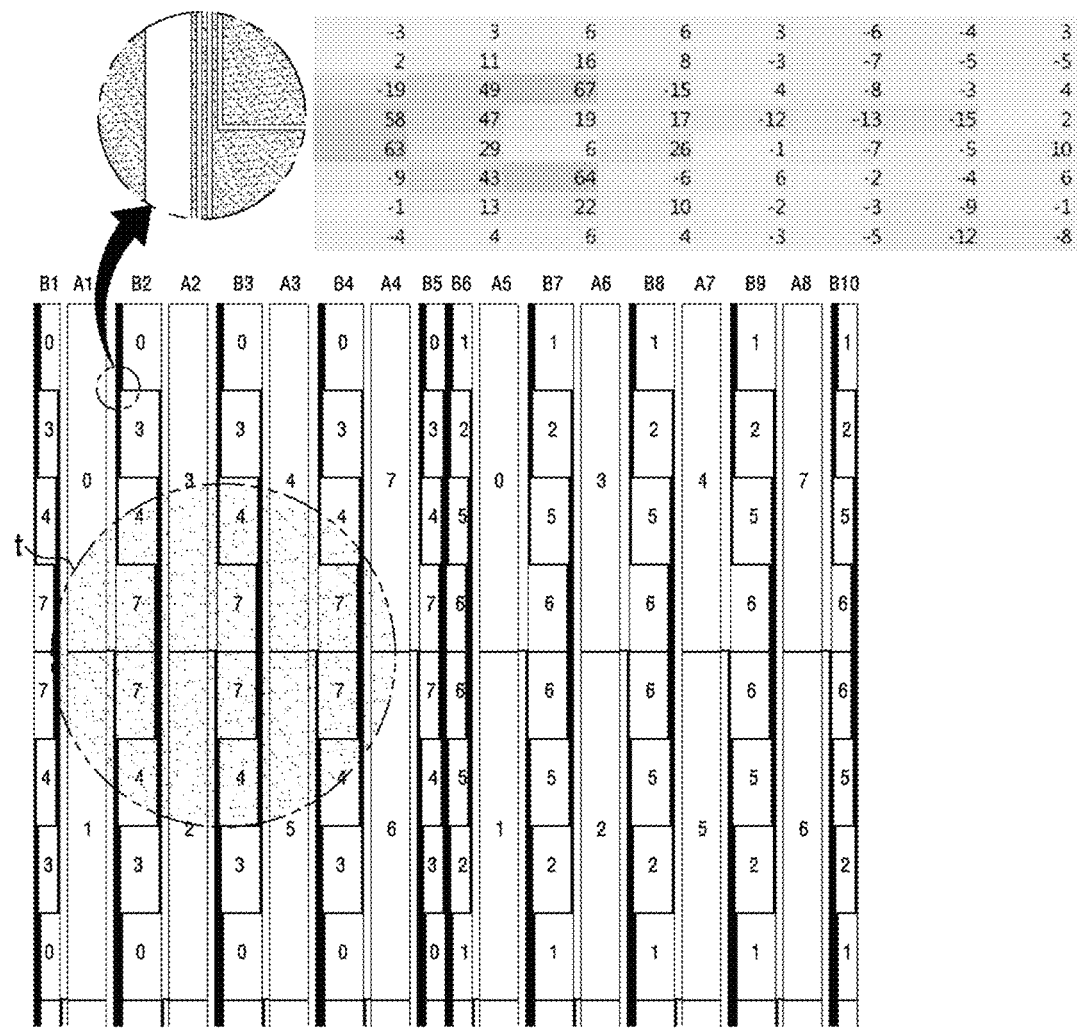

[Figure 18]
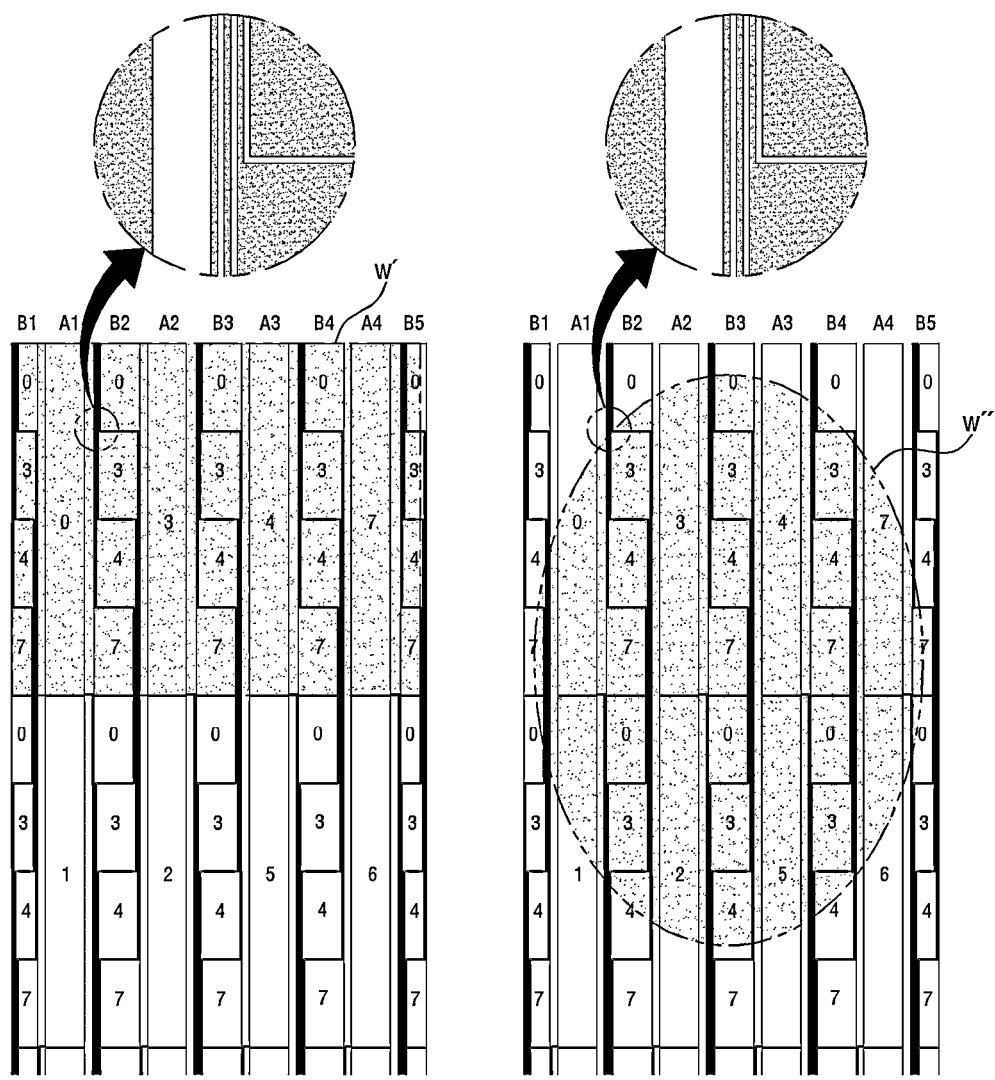

TOUCH SENSOR PANEL

CROSS-REFERENCE TO RELATED PATENT APPLICATIONS

The present application is a U.S. national stage application under 35 U.S.C. § 371 of PCT Application No. PCT/KR2020/001924, filed Feb. 11, 2020, which claims priority to Korean Patent Application No. 10-2019-0034236, filed Mar. 26, 2019. The disclosures of the aforementioned priority applications are incorporated herein by reference in their entireties.

TECHNICAL FIELD

The present invention relates to a touch sensor panel, and more particularly, to a touch sensor panel which is capable of improving a splitting phenomenon of an output touch signal when a device having a touch sensor panel is touched with one finger in a state where the device is not held with a hand.

BACKGROUND ART

Various types of input devices are used to operate a computing system. For example, the input devices, such as a button, a key, a joystick, and a touch screen, are used. Due to the easy and convenient operation of the touch screen, the use of the touch screen is increasing in the operation of computing systems.

The touch screen may configure a touch surface of a touch input device including a touch sensor panel that may be a transparent panel provided with a touch-sensitive surface. The touch sensor panel may be attached on a front surface of a display screen, so that the touch-sensitive surface may cover a viewed surface of the display screen. A user is allowed to operate a computing system by simply touching the touch screen with a finger and the like. In general, the computing system recognizes a touch and a touch position on a touch screen and interprets the touch to perform a calculation according to the interpretation.

The touch sensor panel applies a driving signal to a driving electrode and determines whether a touch is input from a signal input through a receiving electrode. The driving electrode and the receiving electrode may also be formed on different layers, and may also be formed on the same layer. The example in which the driving electrode and the receiving electrode are formed on the same layer is US Patent Application Publication No. US2013/0181942. When the driving electrode and the receiving electrode are formed on the different layers, raw costs increase, so that it is preferable to form the driving electrode and the receiving electrode on the same layer. However, even though the driving electrode and the receiving electrode are implemented on the same layer, it is necessary to decrease the number of wires, decrease noise by variously changing an electrode disposition form of the touch sensor panel including the decreased number of wires, or suppress the generation of unnecessary signals.

Further, in the case where the driving electrode and the receiving electrode are implemented on the same layer, compared to the state where a user holds a device, such as a smart phone, in which the touch sensor panel is embedded, and touches the touch sensor panel with a hand, when the user touches the touch sensor panel without holding the device by hand, there occurs a problem in that a touch signal output by Low Ground Mass (LGM) is changed. In particular, there occurs a problem in that a touch signal output in the state where the user does not hold the device with the hand (hereinafter, referred to as a "floating state") is split in a left and right direction or an up and down direction. The problem of the horizontal split or vertical split of the output touch signal may cause the device to incorrectly determine one touch input by the user as two or more multi-touches, resulting in malfunction of the device unintended by the user.

DISCLOSURE

Technical Problem

A problem to be solved by the present invention is to provide a touch sensor panel which is capable of improving horizontal split of a touch signal output in the state where the touch sensor panel in which driving electrodes and receiving electrodes are disposed on the same layer is in a floating state.

Further, the present invention provides a touch sensor panel which is capable of improving vertical split of a touch signal output in the state where the touch sensor panel in which driving electrodes and receiving electrodes are disposed on the same layer is in a floating state.

Technical Solution

A touch sensor panel according to an exemplary embodiment of the present invention is a touch sensor panel in which a plurality of driving electrodes and a plurality of receiving electrodes are arranged on the same layer, in which the plurality of receiving electrodes is arranged along a plurality of rows and columns, the plurality of driving electrodes is arranged such that at least one driving electrode is disposed at each of both sides with respect to each receiving electrode, and the driving electrode arranged at the left side and the driving electrode arranged at the right side with the receiving electrode interposed therebetween are electrically connected with each other.

A touch sensor panel according to another exemplary embodiment of the present invention is a touch sensor panel in which a plurality of driving electrodes and a plurality of receiving electrodes are arranged on the same layer, in which the plurality of driving electrodes is arranged along a plurality of rows and columns, the plurality of receiving electrodes is arranged such that at least one receiving electrode is disposed at each of both sides with respect to each driving electrode, and the receiving electrode arranged at the left side and the receiving electrode arranged at the right side with the driving electrode interposed therebetween are electrically connected to different wires.

A touch sensor panel according to still another exemplary embodiment of the present invention is a touch sensor panel including a plurality of first electrodes arranged in plural on the same layer in a first direction and a second direction and a plurality of second electrodes arranged in plural in the first direction and the second direction, in which the plurality of first electrodes includes at least a first-a electrode and a first-b electrode arranged in the second direction, the first-a electrode and the first-b electrode are connected to different wires, respectively, and are electrically separated from each other, and the plurality of second electrodes includes a plurality of different second-a electrodes arranged to be adjacent to the first-a electrode and a plurality of different second-b electrodes arranged to be adjacent to the first-b electrode, the second-a electrodes are electrically connected with each other through wires so as to correspond one to one to the second-b electrodes, mutual capacitance is generated between each of the second-a electrodes and the first-a electrode, and mutual capacitance is generated between each of the second-b electrodes and the first-b electrode, and a touch window area is configured to cover a first number of first electrodes consecutive in the first direction among the plurality of first electrodes and a second number of second electrodes consecutive in the second direction with respect to each of the first number of first electrodes on the touch sensor panel, and the plurality of second electrodes is arranged so as to satisfy a condition in which the same second electrodes are not consecutively disposed in the second direction in the touch window area.

A touch sensor panel according to yet another exemplary embodiment of the present invention is a touch sensor panel including a plurality of first electrodes arranged in plural on the same layer in a first direction and a second direction and a plurality of second electrodes arranged in plural in the first direction and the second direction, in which the plurality of first electrodes includes at least a first-a electrode and a first-b electrode arranged in the second direction, the first-a electrode and the first-b electrode are connected to different wires, respectively, and are electrically separated from each other, the plurality of second electrodes includes a plurality of different second-a electrodes arranged to be adjacent to the first-a electrode and a plurality of different second-b electrodes arranged to be adjacent to the first-b electrode, the second-a electrodes are electrically connected with each other through wires so as to correspond one to one to the second-b electrodes, mutual capacitance is generated between each of the second-a electrodes and the first-a electrode, and mutual capacitance is generated between each of the second-b electrodes and the first-b electrode, a touch window area is configured to cover first electrodes included in a first length among the plurality of first electrodes and second electrodes included in a second length among the plurality of second electrodes on the touch sensor panel, and the plurality of second electrodes is arranged so as to satisfy a condition in which the same second electrodes are not consecutively disposed in the second direction in the touch window area.

Advantageous Effects

When the touch sensor panel according to the exemplary embodiment of the present invention is used, there is an advantage in that it is possible to improve and prevent horizontal split of a touch signal output in a floating state of the touch sensor panel. Accordingly, there is an advantage in that it is possible to prevent malfunction of the touch sensor panel and a touch input device including the touch sensor panel.

Further, there is an advantage in that it is possible to improve and prevent vertical split of a touch signal output in a floating state of the touch sensor panel. Accordingly, there is an advantage in that it is possible to prevent malfunction of the touch sensor panel and a touch input device including the touch sensor panel.

DESCRIPTION OF DRAWINGS

FIG. 1A is a configuration diagram of a touch sensor panel, and FIGS. 1B to 1D are diagrams illustrating disposition forms of the touch sensors implemented on different layers or touch sensors implemented on the same layer.

FIG. 2 is a diagram schematically illustrating an arrangement structure of a plurality of driving electrodes and a plurality of receiving electrodes as an example of a touch sensor panel in which a horizontal splitting phenomenon occurs in a touch signal.

FIGS. 3 to 7 are diagrams for describing a horizontal splitting phenomenon of an output touch signal when a part of the touch sensor panel is touched with a finger in the state where a device including the touch sensor panel illustrated in FIG. 2 is floated.

FIG. 8A is an enlarged diagram of only a part of an arrangement structure of driving electrodes and receiving electrodes of a touch sensor panel according to a first exemplary embodiment, and FIG. 8B is an experimental data showing that horizontal split is improved when a conductive rod of 15 phi is in contact with the touch sensor panel in the state where the touch sensor panel illustrated in FIG. 8A is in a floating state.

FIG. 9A is an enlarged view of only a part of the arrangement structure of driving electrodes and the receiving electrodes of a touch sensor panel according to a second exemplary embodiment, and FIG. 9B is an experimental data showing that horizontal split is improved when a conductive rod of 15 phi is in contact with the touch sensor panel in the state where the touch sensor panel illustrated in FIG. 9A is in a floating state.

FIG. 10A is an enlarged view of only a part of the arrangement structure of driving electrodes and receiving electrodes of a touch sensor panel according to a third exemplary embodiment, and FIG. 10B is an experimental data showing that horizontal split is improved when a conductive rod of 15 phi is in contact with the touch sensor panel in the state where the touch sensor panel illustrated in FIG. 10A is in a floating state.

FIG. 11A is an enlarged view of a part of the arrangement structure of driving electrodes and receiving electrodes of a touch sensor panel according to a fourth exemplary embodiment, and FIG. 11B is an experimental data showing that horizontal split is improved when a conductive rod of 15 phi is in contact with the touch sensor panel in the state where the touch sensor panel illustrated in FIG. 11A is in a floating state.

FIG. 12A is an enlarged view of only a part of the arrangement structure of driving electrodes and receiving electrodes of a touch sensor panel according to a fifth exemplary embodiment, and FIG. 12B is an experimental data showing that horizontal split is improved when a conductive rod of 15 phi is in contact with the touch sensor panel in the state where the touch sensor panel illustrated in FIG. 12A is in a floating state.

FIG. 13B is an experimental data showing that horizontal split is improved when a conductive rod of 15 phi is in contact with the touch sensor panel in the state where the touch sensor panel illustrated in FIG. 13A is in a floating state.

FIG. 14B is an experimental data showing that horizontal split is improved when a conductive rod of 15 phi is in contact with the touch sensor panel in the state where the touch sensor panel illustrated in FIG. 14A is in a floating state.

FIG. 16 is a diagram illustrating a vertical split phenomenon occurring in the touch sensor panel according to the first exemplary embodiment illustrated in FIGS. 8A and 8B.

FIG. 18 is a diagram illustrating modified examples of a touch window area w illustrated in FIG. 17.

FIG. 19 is a diagram illustrating a vertical split phenomenon occurring in the touch sensor panel according to the fourth exemplary embodiment illustrated in FIGS. 11A and 11B.

FIG. 20 is a diagram illustrating a vertical split phenomenon occurring in the touch sensor panel according to the fifth exemplary embodiment illustrated in FIGS. 12A and 12B.

FIGS. 21A-F are diagrams illustrating a decrease in an LGM jamming signal by the number of unit cells configuring the same driving electrodes TX and the number of unit cells configuring the same receiving electrodes RX disposed in a touch window area having a predetermined size.

MODE FOR INVENTION

Figure 13A:
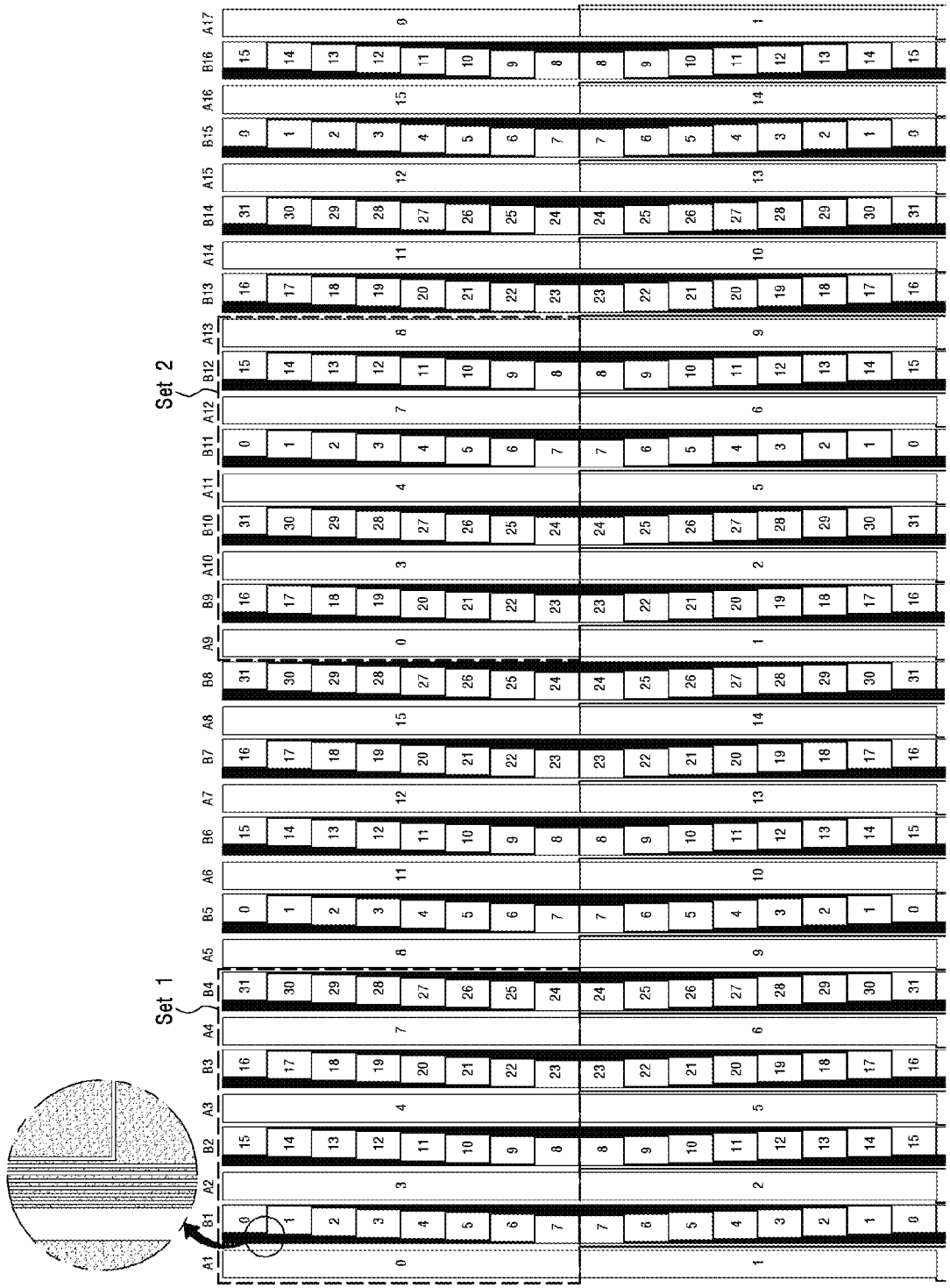
FIG. 13A is an enlarged view of only a part of the arrangement structure of driving electrodes and receiving electrodes of a touch sensor panel according to a sixth exemplary embodiment.

In the detailed description of the present invention described below, reference is made to the accompanying drawings, which illustrate a specific exemplary embodiment in which the present invention may be carried out, as an example. The exemplary embodiment is described in detail sufficient to enable a person skilled in the art to carry out the present invention. It should be understood that various exemplary embodiments of the present invention are different from each other, but need not to be mutually exclusive. For example, specific shapes, structures, and characteristics described herein may be implemented in other exemplary embodiments without departing from the spirit and the scope of the present invention in relation to one exemplary embodiment. Further, it should be understood that a location or disposition of an individual component in each disclosed exemplary embodiment may be changed without departing from the spirit and the scope of the present invention. Accordingly, the detailed description below is not intended to be taken in a limited meaning, and the scope of the present invention, if appropriately described, is limited only by the appended claims along with all scopes equivalent to those claimed by the claims. Like reference numerals in the drawings refer to the same or similar functions over several aspects.

Hereinafter, a touch input device according to an exemplary embodiment of the present invention will be described with reference to the accompanying drawings. Hereinafter, a capacitive type touch sensor panel 1 will be exemplified, but the touch input device 1000 is also identically/similarly applied to the touch sensor panel 1 which is capable of detecting a touch position by a predetermined method.

FIG. 1A is a schematic diagram illustrating a capacitive type touch sensor 10 included in the touch sensor panel 1 of the general touch input device 1000 and a configuration for an operation of the touch sensor 10. Referring to FIG. 1A, the touch sensor 10 includes the plurality of driving electrodes TX1 to TXn and the plurality of receiving electrodes RX1 to RXm, and a driving unit 12 which applies a driving signal to the plurality of driving electrodes TX1 to TXn for an operation of the touch sensor 10, and a detection unit 11 which receives a detection signal including information on the amount of capacitance changed according to a touch to a touch surface from the plurality of receiving electrodes RX1 to RXm and detects the touch and a touch position.

As illustrated in FIG. 1A, the touch sensor 10 may include the plurality of driving electrodes TX1 to TXn and the plurality of receiving electrodes RX1 to RXm. FIG. 1A illustrates the case where the plurality of driving electrodes TX1 to TXn and the plurality of receiving electrodes RX1 to RXm of the touch sensor 10 configure an orthogonal array, but the present invention is not limited thereto, and the plurality of driving electrodes TX1 to TXn and the plurality of receiving electrodes RX1 to RXm may have any number of dimensions and applications arrangements thereof including a diagonal arrangement, a concentric arrangement, and a three-dimensional random arrangement. Herein, n and m are positive integers, and may have the same or different values, and have different sizes depending on an exemplary embodiment.

The plurality of driving electrodes TX1 to TXn and the plurality of receiving electrodes RX1 to RXm may be arranged to cross each other. The driving electrode TX may include the plurality of driving electrodes TX1 to TXn extending in a first axis direction, and the receiving electrode RX may include the plurality of receiving electrodes RX1 to RXm extending in a second axis direction crossing the first axis direction.

As illustrated in FIG. 1B, the plurality of driving electrodes TX1 to TXn and the plurality of receiving electrodes RX1 to RXm may be formed on different layers. For example, any one of the plurality of driving electrodes TX1 to TXn and the plurality of receiving electrodes RX1 to RXm may be formed on an upper surface of a display panel (not illustrated), and the other one may be formed on a lower surface of a cover which is to be described below or inside the display panel (not illustrated).

Further, as illustrated in FIGS. 1C and 1D, the plurality of driving electrodes TX1 to TXn and the plurality of receiving electrodes RX1 to RXm may be formed may be formed on the same layer in the touch sensor 100 according to the exemplary embodiment of the present invention. For example, the plurality of driving electrodes TX1 to TXn and the plurality of receiving electrodes RX1 to RXm may be formed on the upper surface of the display panel.

The plurality of driving electrodes TX1 to TXn and the plurality of receiving electrodes RX1 to RXm may be made of a transparent conductive material (for example, indium tin oxide (ITO) or antimony tin oxide (ATO) made of tin oxide ($SnO_2$) and indium oxide ($In_2O_3$)). However, this is merely an example, and the driving electrode TX and the receiving electrode RX may also be formed of other transparent conductive materials or an opaque conductive material. For example, the driving electrode TX and the receiving electrode RX may include at least one of silver ink, copper, nano silver, and carbon nanotube (CNT). Further, the driving electrode TX and the receiving electrode RX may be implemented with a metal mesh.

The driving unit 12 according to the exemplary embodiment of the present invention may apply a driving signal to the driving electrodes TX1 to TXn. In the exemplary embodiment of the present invention, the driving signal may be sequentially applied to one driving electrode at a time from the first driving electrode TX1 to the nth driving electrode TXn. The application of the driving signal may be repeatedly performed. However, this is merely an example, and the driving signal may also be simultaneously applied to the plurality of driving electrodes according to the exemplary embodiment.

The detection unit 11 may detect whether a touch is input and a touch position by receiving a detection signal including information on capacitance (Cm; 14) generated between the driving electrodes TX1 to TXn, to which the driving signal is applied through the receiving electrodes RX1 to RXm and the receiving electrodes RX1 to RXm. For example, the detection signal may be the signal in which the driving signal applied to the driving electrode TX is coupled by the capacitance (Cm: 14) generated between the driving electrode TX and the receiving electrode RX. As described above, the process of detecting the driving signal applied from the first driving electrode TX1 to the nth driving electrode TXn through the receiving electrodes RX1 to RXm may be referred to as scanning the touch sensor 10.

For example, the detection unit 11 may include a receiver (not illustrated) connected with each of the receiving electrodes RX1 to RXm through a switch. The switch is turned on in a time period for detecting the signal of the corresponding receiving electrode RX so that the sensing signal from the receiving electrode RX may be detected by the receiver. The receiver may include an amplifier (not illustrated) and a feedback capacitor coupled between a negative (−) input terminal of the amplifier and an output terminal of the amplifier, that is, a feedback path. In this case, a positive (+) input terminal of the amplifier may be connected to ground. Further, the receiver may further include a reset switch connected to the feedback capacitor in parallel. The reset switch may reset a conversion from a current to a voltage performed in the receiver. The negative input terminal of the amplifier may be connected to the corresponding receiving electrode RX and receive a current signal including information on the capacitance (Cm: 14) and then integrate the received current signal and convert the integrated current signal to a voltage. The detection unit 11 may further include an analog to digital converter (ADC) (not illustrated) which converts the data integrated through the receiver to digital data. Later, the digital data may be input to a processor (not illustrated) and processed so as to obtain touch information for the touch sensor 10. The detection unit 11 may include the ADC and the processor together with the receiver.

A control unit 13 may perform a function of controlling the operations of the driving unit 12 and the detection unit 11. For example, the control unit 13 may generate a driving control signal and then transmit the generated driving control signal to the driving unit 12 so that the driving signal is applied to a predetermined driving electrode TX at a predetermined time. Further, the control unit 13 may generate a detection control signal and then transmit the generated detection control signal to the detection unit 11 to make the detection unit 11 receive the detection signal from a predetermined receiving electrode RX at a predetermined time and perform a predetermined function.

In FIG. 1A, the driving unit 12 and the detection unit 11 may configure a touch detecting device (not illustrated) which is capable of detecting whether a touch is input to the touch sensor 10 and a touch position. The touch detecting device may further include the control unit 13. The touch detecting device may be integrated on a touch sensing Integrated Circuit (IC). The driving electrode TX and the receiving electrode RX included in the touch sensor 10 may be connected to the driving unit 12 and the detection unit 11 included in the touch sensing IC through, for example, a conductive trace and/or a conductive pattern printed on a circuit board. The touch sensing IC may be positioned on a circuit board on which a conductive pattern is printed, for example, a touch circuit board (hereinafter, referred to as a touch PCB). According to the exemplary embodiment, the touch sensing IC may be mounted on a main board for operating the touch input device 1000.

As described above, capacitance (Cm) having a predetermined value is generated at each crossing point of the driving electrode TX and the receiving electrode RX, and when an object, such as a finger, approaches the touch sensor 10, the value of the capacitance may be changed. In FIG. 1A, the capacitance may represent mutual capacitance (Cm). The detection unit 11 may detect the electric characteristic to detect whether a touch is input to the touch sensor 10 and/or a touch position. For example, the detection unit 10 may detect whether a touch is input for the surface of the touch sensor 10, which is formed of a two-dimensional plane consisting of a first axis and a second axis, and/or the position of the touch.

More particularly, the detection unit 10 may detect the position of the touch in the direction of the second axis by detecting the driving electrode TX to which the driving signal is applied when the touch for the touch sensor 10 is generated. Similarly, when the touch to the touch sensor 10 is input, the detection unit 10 may detect the position of the touch in the direction of the first axis by detecting a change in the capacitance from the reception signal received through the receiving electrode RX.

As illustrated in FIGS. 1C and 1D, when the driving electrode and the receiving electrode are disposed on the same layer, the number of wires may increase. Accordingly, based on FIG. 2, the touch sensor panel in the form in which the number of wires is decreased, will be described, and the reason why the horizontal split of the touch signal output from the touch sensor panel in the form in which the number of wires is decreased occurs will be described.

FIG. 2 is a diagram illustrating an example of the touch sensor panel in which a horizontal split phenomenon of the touch signal occurs, and illustrates the case where the plurality of driving electrodes and the plurality of receiving electrodes are formed in a matrix type.

As illustrated in FIG. 2, in the typical touch sensor panel, the plurality of driving electrodes TX and the plurality of receiving electrodes Rx are arranged on the same layer in the matrix form.

More particularly, in the plurality of columns, the plurality of receiving electrodes RX are disposed apart from each other in odd-numbered columns, and the plurality of driving electrodes TX are disposed apart from each other in even-numbered columns.

One electrode group G including one receiving electrode RX and the plurality of driving electrodes TX is arranged in plural in a first direction (or a row direction or a left-right direction). Herein, the number of driving electrodes TX included in one electrode group G may be four as illustrated in FIG. 2, but the present invention is not limited thereto, and the number of driving electrodes TX may be three or five or more.

One electrode group G includes a plurality of unit cells U. Herein, one unit cell U may be configured as one part of one driving electrode TX and the receiving electrode RX adjacent to the driving electrode TX in the first direction (or the row direction or the left-right direction). Accordingly, in case of FIG. 2, one electrode group G may be formed of four unit cells U. In particular, an area of the unit cell U may be approximately 4 mm in the column direction (or vertically) and 4 mm in the row direction (or horizontally).

The driving electrode TX is smaller than the receiving electrode RX. For example, the driving electrode TX may have a quadrangular shape of approximately 2 mm in width and 4 mm in length, and the receiving electrode RX may have a quadrangular shape of approximately 2 mm in width and 16 mm in length. The horizontal length and the vertical length may be appropriately changed according to a design.

In the touch sensor panel illustrated in FIG. 2, the number indicated in the driving electrode TX and the receiving electrode RX means the number of the driving electrode TX and the number of the receiving electrode RX, and the driving electrodes TX of the same number are electrically connected with each other through wires (or conductive trace). The same driving signal is applied to the driving electrodes TX of the same number at the same time. The receiving electrodes RX of the same number may also be electrically connected with each other through wires (or conductive trace).

FIGS. 3 to 7 are diagrams for describing the horizontal split phenomenon of the output touch signal in the case where a part of the touch sensor panel is touched with a predetermined object (for example, a finger) in the state where the device including the touch sensor panel illustrated in FIG. 2 is floated. Herein, the state where the device including the touch sensor panel is floated is the state where the device is placed in a Low Ground Mass (LGM) state, and refers to, for example, the state where the device is not gripped by the hand of the user.

FIG. 3 is a diagram illustrating an example of the case where a finger (thumb) is touched within a predetermined area A of the touch sensor panel illustrated in FIG. 2. In FIG. 3, it is assumed that the finger is touched in a width of 20 mm in the first direction (or the row direction or the horizontal direction). The touch with the width of 20 mm is a rather extreme situation, but if the problem occurring in this situation can be solved, a problem occurring in another general situation may also be solved.

FIG. 4 is a diagram for describing a final touch signal output through a first reception terminal in the case where in the situation illustrated in FIG. 3, the driving signal is applied to the plurality of first driving electrodes TX1 and the plurality of first receiving electrodes RX1 outputs a detection signal.

Referring to FIGS. 3 and 4, predetermined capacitance (Cm) is formed between the first driving electrode TX1-*a* located at the left side and two first receiving electrodes RX1-*a* and RX1-*b* located at both sides of the first driving electrode TX1-*a*, but the finger is not in contact with the first driving electrode TX1-*a* and the two first receiving electrodes RX1-*a* and RX1-*b*, so that the amount of capacitance changed is not generated from the two first receiving electrodes RX1-*a* and RX1-*b*. Accordingly, the number of abnormal touch signals output from the two first receiving electrodes RX1-*a* and RX1-*b* is 0.

In contrast, when the driving signal is applied to the first driving electrode TX1-*a* located at the left side, the same driving signal is also simultaneously applied to the first driving electrode TX1-*b* located between two third receiving electrodes RX3. Then, coupling capacitance is formed between the first driving electrode TX1-*b* and the finger, and in this case, when the finger is in the LGM state, the driving signal applied to the first driving electrode TX1-*b* is transmitted to the three first receiving electrodes RX1-*b*, RX1-*c*, and RX1-*d* that are being in contact with the finger. That is, the finger in the LGM state forms a current path. Accordingly, an LGM jamming signal (− diff) having a sign opposite to that of a normal touch signal is output from each of the three first receiving electrodes RX1-*b*, RX1-*c*, and RX1-*d* that are being in contact with the finger. Herein, the reason why the LGM jamming signal has the sign opposite to that of the normal touch signal is that in the normal touch signal, when the finger is in contact with the receiving electrodes in the state where predetermined mutual capacitance (Cm) is formed between the driving electrode and the receiving electrode, the mutual capacitance (Cm) is decreased, but in the LGM jamming signal, the coupling capacitance is generated due to the contact of the finger in the floating state, so that the LGM jamming signal and the normal touch signal have opposite signs. In the meantime, the size of the normal touch signal may be the same as or different from the size of the LGM jamming signal, so that hereinafter, for convenience of the description, it is assumed that the normal touch signal is 1 diff and the LGM jamming signal is −1 diff.

The first reception terminal outputs a touch signal by summing all of the signals output from the four first receiving electrodes RX1-*a*, RX1-*b*, RX1-*c*, and RX1-*d*, and there is no amount of capacitance changed in the first receiving electrode RX1-*a*, so that 0 diff is output, and the LGM jamming signal (−1 diff) is output from each of the three remaining first receiving electrodes RX1-*b*, RX1-*c*, and RX1-*d*, so that a touch signal corresponding to −3 diff is output from the first reception terminal as a result.

FIG. 5 is a diagram for describing a touch signal output through the first reception terminal in the case where in the situation illustrated in FIG. 3, the driving signal is applied to the plurality of ninth driving electrodes TX9-*a* and TX9-*b* and the plurality of first receiving electrodes RX1-*a*, RX1-*b*, RX1-*c*, and RX1-*d* outputs a detection signal.

Referring to FIGS. 3 and 5, predetermined capacitance (Cm) is formed between the ninth driving electrode TX9-*a* located at the left side and two first receiving electrodes RX1-*c* and RX1-*d* located at both sides of the ninth driving electrode TX9-*a*, but the finger is in contact with the ninth driving electrode TX9-1 and the two first receiving electrodes RX1-*c* and RX1-*d*, so that the normal touch signal 1 diff is output from each of the two first receiving electrodes RX1-*c* and RX1-*d*.

In the meantime, when the driving signal is applied to the ninth driving electrode TX9-*a*, coupling capacitance is formed between the ninth driving electrode TX9-*a* and the finger, and in this case, when the finger is in the LGM state, the driving signal applied to the ninth driving electrode TX9-*a* is transmitted to the three first receiving electrodes RX1-*b*, RX1-*c*, and RX1-*d* that are being in contact with the finger. That is, the finger in the LGM state forms a current path. Accordingly, the LGM jamming signal (−1 diff) having a sign opposite to that of the normal touch signal is output from each of the three first receiving electrodes RX1-*b*, RX1-*c*, and RX1-*d* that are being in contact with the finger.

The first reception terminal outputs a touch signal by summing all of the signals output from the four first receiving electrodes RX1-*a*, RX1-*b*, RX1-*c*, and RX1-*d*, and the normal touch signal (1 diff) is output from each of the two first receiving electrodes RX1-*c* and RX1-*d* and the LGM jamming signal (−1 diff) is also output from each of the three remaining first receiving electrodes RX1-*b*, RX1-*c*, and RX1-*d* together, so that the touch signal corresponding to −1 diff is output from the first reception terminal as a result.

FIG. 6 is a graph and a table in which the situations of FIGS. 4 and 5 and additional situations are synthesized.

Referring to the table of FIG. 6, the first row is the situation of FIG. 4, in which the driving signal is applied to the plurality of first driving electrodes TX1-*a* and TX1-*b* and the touch signal is output from the plurality of first receiving electrodes RX1-a, RX1-b, RX1-c, and RX1-d, and the third row is the situation of FIG. 5, in which the driving signal is applied to the plurality of ninth driving electrodes TX9-a and TX9-b and the touch signal is output from the plurality of first receiving electrodes RX1-a, RX1-b, RX1-c, and RX1-d.

In the table of FIG. 6, the fourth row is the case where the driving signal is applied to the plurality of thirteenth driving electrodes TX13, and the sum of touch signals output from the plurality of first receiving electrodes RX1 is −2 diff. In the table of FIG. 6, the fifth row is the case where the driving signal is applied to the plurality of thirteenth driving electrodes TX13, and the sum of touch signals output from the plurality of third receiving electrodes RX3 is −2 diff. Referring to the graph of FIG. 6, when the driving signal is applied to the thirteenth driving electrode TX13, the final touch signal is indicated by −4 diff, and this is due to the sum in the remap process in which the touch signal in the fourth row of the table of FIG. 6 and the touch signal in the fifth row of the table of FIG. 6 are mapped.

Referring to the graph of FIG. 6, when the driving signal is applied to the thirteenth driving electrode TX13, a difference between the touch signal (diff) output in the state where the device including the touch sensor panel is in the floating state and the touch signal (diff) output in the state where the device including the touch sensor panel is in the gripped state is large. Due to the difference, a single touch is input to a specific portion including the thirteenth driving electrode TX13 of the touch sensor panel in the LGM state, a phenomenon in which the touch signal is split in the left and right direction occurs in the specific portion.

FIG. 7 is the table and the graph representing the actual test of the situation of FIG. 6.

Referring to FIG. 7, the −diff value of the LGM jamming signal may be calculated from the case where there is only the LGM jamming signal (the first row and the eighth row of the table of FIG. 6) and the number of LGM jamming signals (the number of LGMs).

A compensation value by the LGM may be calculated by using the calculated −diff value of the LGM jamming signal, and when the compensation value is compared with a measurement value (the original value that needs to be output) in the state where the device is gripped, it was confirmed that the measurement value (the original value that needs to be output) in the state where the device is gripped is almost similar to the compensation value by the LGM.

As described above, in the touch sensor panel illustrated in FIG. 2, when the user single touches the specific portion in the state where the device including the touch sensor panel is in the floating state, the phenomenon in which the output touch signal is split in the left and right direction may occur. Due to the horizontal split phenomenon of the touch signal, the device including the touch sensor panel may incorrectly recognize one touch of the user as multi-touch and perform an operation that does not match the user's intention.

Figure 9B:
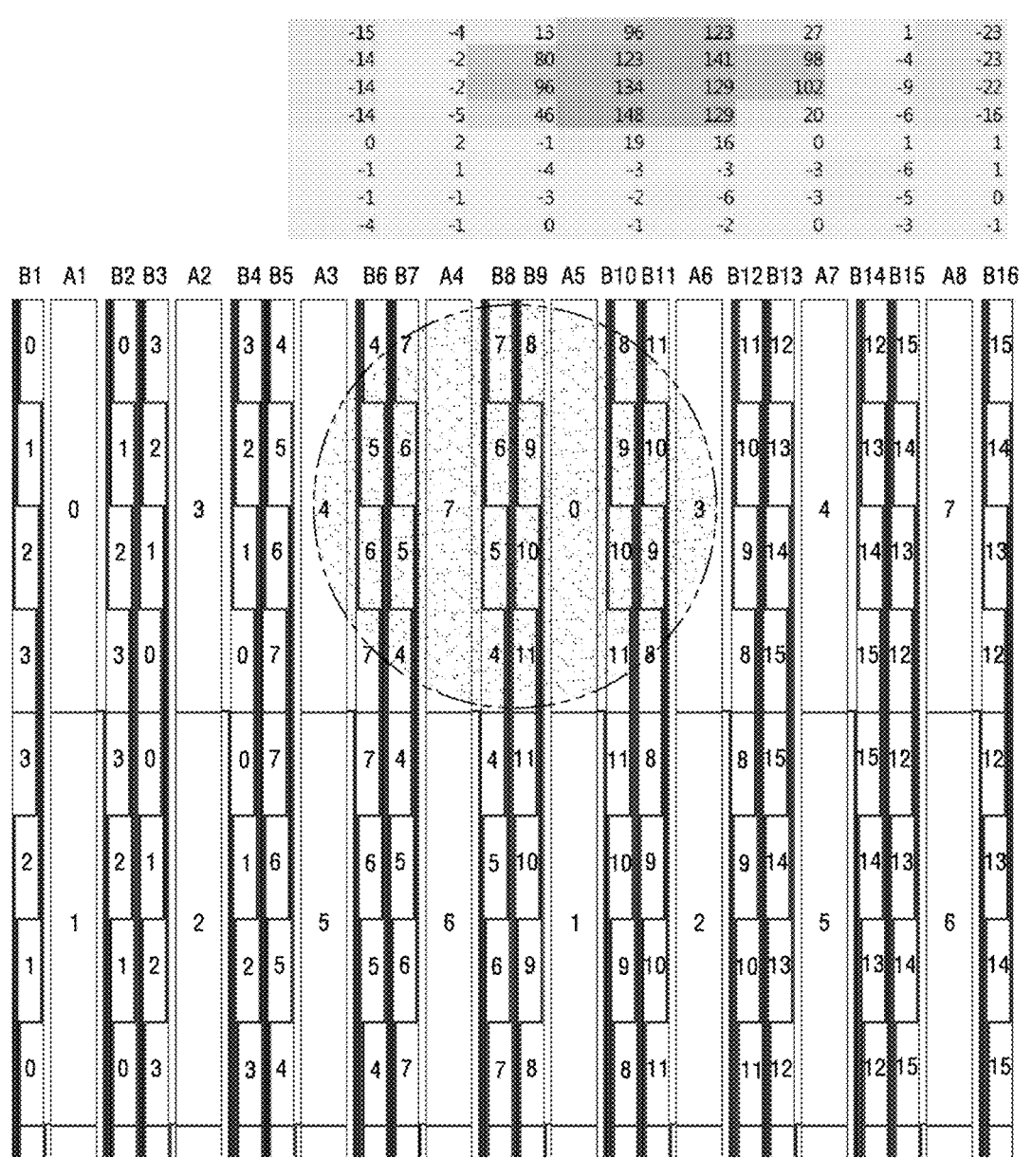

Hereinafter, the touch sensor panels according to the exemplary embodiment of the present invention, which are capable of improving the phenomenon in which a touch signal output from the touch sensor panel in the floating state is split in the left and right direction, will be described with reference to FIGS. 8A to 14B.

The touch sensor panels illustrated in FIGS. 8A to 14B may improve the phenomenon in which the touch signal output from the touch sensor panel in the floating state is split in the left and right direction. In the touch sensor panels illustrated in FIGS. 8A to 14B, two second electrodes adjacent to both sides with respect to each first electrode are the same, or two second electrodes adjacent to both sides with respect to each first electrode are different from each other. Herein, the first electrode and the second electrode may be configured oppositely, and any one of the first electrode and the second electrode is a receiving electrode RX and the remaining one is a driving electrode TX. The meaning of the same is that the electrodes are electrically connected with each other through wires (or conductive trace).

More particularly, in the touch sensor panels illustrated in FIGS. 8A to 14B, two driving electrodes TX adjacent to both sides with respect to each receiving electrode RX are the same or two driving electrodes TX adjacent to both sides with respect to each receiving electrode RX are different from each other. Otherwise, two receiving electrodes RX adjacent to both sides with respect to each driving electrode TX are the same or two receiving electrodes RX adjacent to both sides with respect to each driving electrode TX are different from each other.

The touch sensor panels illustrated in FIGS. 8A to 14B may improve the phenomenon in which the touch signal output from the touch sensor panel in the floating state is split in the left and right direction.

Hereinafter, each touch sensor panel will be described, and it is assumed that each driving electrode and each receiving electrode are disposed while being spaced apart from each other at a predetermined interval, and the receiving electrodes of the same number are electrically connected with each other through wires, and the driving electrodes of the same number are also electrically connected with each other through wires. Herein, two driving electrodes or receiving electrodes consecutive in the column direction have the same number, two driving electrodes or receiving electrodes consecutive in the column direction may be configured as one according to a design.

First Exemplary Embodiment

FIG. 8A is an enlarged diagram of only a part of an arrangement structure of driving electrodes and receiving electrodes of a touch sensor panel according to a first exemplary embodiment, and FIG. 8B is an experimental data showing that horizontal split is improved when a conductive rod of 15 phi is in contact with the touch sensor panel in the state where the touch sensor panel illustrated in FIG. 8A is in a floating state.

Referring to FIG. 8A, the touch sensor panel according to the first exemplary embodiment includes the plurality of driving electrodes TX and the plurality of receiving electrodes RX. The plurality of driving electrodes TX and the plurality of receiving electrodes RX are arranged on the same layer in a matrix form.

The plurality of driving electrodes TX and the plurality of receiving electrodes RX may be made of a transparent conductive material (for example, indium tin oxide (ITO) or antimony tin oxide (ATO) made of tin oxide ($SnO_2$) and indium oxide ($In_2O_3$)) and the like. However, this is merely an example, and the driving electrode TX and the receiving electrode RX may also be formed of other transparent conductive materials or an opaque conductive material. For example, the driving electrode TX and the receiving electrode RX may include at least one of silver ink, copper, nano silver, and carbon nanotube (CNT).

Wires (or conductive trace) are connected to each of the driving electrodes TX and the receiving electrodes RX. In the following drawings including FIG. 8A, it seems that the wires having various thicknesses are illustrated, but it should be noted that as in the enlarged view of the part illustrated at the top of FIG. 8A, several wires are densely arranged so that wires of various thicknesses appear. As a matter of course, the thicknesses of the wires may also be different from each other depending on a case.

Further, the driving electrode TX and the receiving electrode RX may be implemented with a metal mesh. When the driving electrode TX and the receiving electrode RX are implemented with the metal mesh, the wires connected to the driving electrode TX and the receiving electrode RX may also be implemented with the metal mesh, and the driving electrode TX and the receiving electrode RX and the wires may also be integrally implemented with the metal mesh. When the driving electrode TX, the receiving electrode RX, and the wires are integrally implemented with the metal mesh, a dead zone, such as a space between the electrode and the wire and/or a space between the electrode and another electrode, in which a touch position is not detected, is reduced, so that sensitivity of detecting a touch position may be further improved.

The touch sensor panel according to the first exemplary embodiment is arranged with respect to the plurality of receiving electrodes RX. Accordingly, hereinafter, the arrangement of the plurality of receiving electrodes RX disposed in columns A1 to A8 will be described first, and an arrangement structure of the plurality of driving electrodes TX will be described.

The plurality of receiving electrodes RX is arranged in each of the plurality of columns A1, A2, A3, A4, A5, A6, A7, and A8. Herein, the plurality of driving electrodes TX is arranged in the plurality of columns B1, B2, B3, B4, B5, B6, B7, B8, B9, and B10 formed between the plurality of columns A1, A2, A3, A4, A5, A6, A7, and A8, in which the receiving electrodes RX are arranged, at the external side of the first column A1, and at the external side of the eighth column A8.

With respect to each receiving electrode RX of the plurality of receiving electrodes RX, the two driving electrodes TX adjacent to both sides have the same characteristic. That is, the two driving electrodes TX adjacent to both sides with respect to each receiving electrode RX have the same number. Herein, the meaning that the two driving electrodes TX are the same or that the numbers of the two driving electrodes TX are the same is that the two driving electrodes TX are electrically connected through wires.

The touch sensor panel according to the first exemplary embodiment includes one or more sets in which the plurality of receiving electrodes RX and the plurality of driving electrodes TX are disposed in a predetermined arrangement. The plurality of sets is repeatedly arranged in the row direction and the column direction, so that the touch sensor panel according to the first exemplary embodiment may be formed.

One set may include the plurality of different receiving electrodes RX, and for example, one set may include eight receiving electrodes including a $0^{th}$ receiving electrode RX0 to a seventh receiving electrode RX7. The eight receiving electrodes RX0, RX1, RX2, RX3, RX4, RX5, RX6, and RX7 may be disposed in a predetermined arrangement. The eight receiving electrodes of the $0^{th}$ receiving electrode RX0 to the eighth receiving electrode RX are divided and arranged in the four columns A1, A2, A3, and A4 consecutive in the row direction. Accordingly, in each of the four columns, the two receiving electrodes may be disposed from top to bottom.

The plurality of receiving electrodes having the consecutive numbers is disposed in each column. Herein, the arrangement order of the odd-numbered columns A1 and A3 and the arrangement order of the even-numbered columns A2 and A4 may be opposite to each other. For example, the receiving electrodes RX0 and RX1 having the consecutive numbers are sequentially arranged from top to bottom in the first column A1, the receiving electrodes RX2 and RX3 having the consecutive numbers are sequentially arranged from bottom to top in the second column A2, the receiving electrodes RX4 and RX5 having the consecutive numbers are sequentially arranged from top to bottom in the third column A3, and the receiving electrodes RX6 and RX7 having the consecutive numbers are sequentially arranged from bottom to top in the fourth column A4. Herein, although not illustrated in the drawing, the plurality of different receiving electrodes included in one set may not be sequentially arranged in the row or column direction, but may be arranged randomly.

In the meantime, the touch sensor panel according to the first exemplary embodiment includes the plurality of driving electrodes TX, and for example, the plurality of driving electrodes TX may include a $0^{th}$ driving electrode TX0 to a seventh driving electrode TX7. Herein, each driving electrode may be disposed to satisfy the following arrangement condition.

The plurality of driving electrodes TX is arranged to satisfy the following conditions. 1) With respect to one receiving electrode RX, four different driving electrodes are arranged at the left side, and four different driving electrodes are arranged at the right side. 2) With respect to each receiving electrode RX, two facing driving electrodes TX have the same number. 3) Five same driving electrodes are consecutively arranged in the row direction. 4) Eight driving electrodes adjacent to both sides of the receiving electrode RX1 in the even-numbered row are arranged to be symmetric to eight driving electrodes adjacent to both sides of the receiving electrode RX0 in the odd-numbered row. 5) A length (horizontal length) of the driving electrodes TX arranged at both edges of each set is a half the length (horizontal length) of the other driving electrodes.

Referring to FIG. 8B, when one conductive rod of 15 phi is in contact with the touch sensor panel in the state where the touch sensor panel of the first exemplary embodiment is in the floating state, it can be seen that the horizontal split hardly appears, through a size of the output touch signal (the final amount of capacitance changed). In the touch sensor panel of the first exemplary embodiment, since the two driving electrodes TX adjacent to both sides with respect to each receiving electrode RX have the same characteristic, the part where the LGM signal rapidly increases in the remap process is gone, so that it is expected that the horizontal split is improved.

Second Exemplary Embodiment

FIG. 9A is an enlarged view of only a part of the arrangement structure of the driving electrodes the receiving electrodes of a touch sensor panel according to a second exemplary embodiment, and FIG. 9B is an experimental data showing that horizontal split is improved when a conductive rod of 15 phi is in contact with the touch sensor panel in the state where the touch sensor panel illustrated in FIG. 9A is in a floating state.

Referring to FIG. 9A, the touch sensor panel according to the second exemplary embodiment includes the plurality of driving electrodes TX and the plurality of receiving electrodes RX. The plurality of driving electrodes TX and the plurality of receiving electrodes RX are arranged on the same layer in a matrix form.

The plurality of driving electrodes TX and the plurality of receiving electrodes RX may be made of a transparent conductive material (for example, indium tin oxide (ITO) or antimony tin oxide (ATO) made of tin oxide ($SnO_2$) and indium oxide ($In_2O_3$)). However, this is merely an example, and the driving electrode TX and the receiving electrode RX may also be formed of other transparent conductive materials or an opaque conductive material. For example, the driving electrode TX and the receiving electrode RX may include at least one of silver ink, copper, nano silver, and carbon nanotube (CNT).

Further, the driving electrode TX and the receiving electrode RX may be implemented with a metal mesh. When the driving electrode TX and the receiving electrode RX are implemented with the metal mesh, the wires connected to the driving electrode TX and the receiving electrode RX may also be implemented with the metal mesh, and the driving electrode TX and the receiving electrode RX and the wires may also be integrally implemented with the metal mesh. When the driving electrode TX, the receiving electrode RX, and the wire are integrally implemented with the metal mesh, a dead zone, such as between the electrode and the wire and/or between the electrode and another electrode, in which a touch position cannot be detected, is reduced, so that sensitivity of detecting a touch position may be further improved.

The touch sensor panel according to the second exemplary embodiment is arranged with respect to the plurality of receiving electrodes RX. Accordingly, hereinafter, the arrangement of the plurality of receiving electrodes RX disposed in columns A1 to A8 will be described first, and an arrangement structure of the plurality of driving electrodes TX will be described.

The plurality of receiving electrodes RX is arranged in plural in each of the plurality of columns A1, A2, A3, A4, A5, A6, A7, and A8. Herein, the plurality of driving electrodes TX is arranged in plural in the plurality of columns B1, B2, B3, B4, B5, B6, B7, B8, B9, B10, B11, B12, B13, B14, B15, and B16 formed between the plurality of columns A1, A2, A3, A4, A5, A6, A7, and A8, in which the receiving electrodes RX are arranged, at the external side of the first column A1, and at the external side of the eighth column A8.

With respect to each receiving electrode RX of the plurality of receiving electrodes RX, the two driving electrodes TX adjacent to both sides have the same characteristic. That is, the two driving electrodes TX adjacent to both sides with respect to each receiving electrode RX have the same number. Herein, the meaning that the two driving electrodes TX are the same or that the numbers of the two driving electrodes TX are the same is that the two driving electrodes TX are electrically connected through wires.

The touch sensor panel according to the second exemplary embodiment includes one or more sets in which the plurality of receiving electrodes RX and the plurality of driving electrodes TX are disposed in a predetermined arrangement. The plurality of sets is repeatedly arranged in the row direction and the column direction, so that the touch sensor panel according to the second exemplary embodiment may be formed.

One set may include the plurality of different receiving electrodes RX, and for example, one set may include eight receiving electrodes including a $0^{th}$ receiving electrode RX0 to a seventh receiving electrode RX7. The eight receiving electrodes RX0, RX1, RX2, RX3, RX4, RX5, RX6, and RX7 may be disposed in a predetermined arrangement. The eight receiving electrodes including the $0^{th}$ receiving electrode RX0 to the seventh receiving electrode RX are divided and arranged in the consecutive four columns A1, A2, A3, and A4 in the row direction. Accordingly, in each of the four columns, the two receiving electrodes may be disposed from top to bottom.

The plurality of receiving electrodes having the consecutive numbers is disposed in each column. Herein, the arrangement order of the odd-numbered columns A1 and A3 and the arrangement order of the even-numbered columns A2 and A4 may be opposite to each other. For example, the receiving electrodes RX0 and RX1 having the consecutive numbers are sequentially arranged from top to bottom in the first column A1, the receiving electrodes RX2 and RX3 having the consecutive numbers are sequentially arranged from bottom to top in the second column A2, the receiving electrodes RX4 and RX5 having the consecutive numbers are sequentially arranged from top to bottom in the third column A3, and the receiving electrodes RX6 and RX7 having the consecutive numbers are sequentially arranged from bottom to top in the fourth column A4. Herein, although not illustrated in the drawing, the plurality of different receiving electrodes included in one set may not be sequentially arranged in the row or column direction, but may be arranged randomly.

In the meantime, the touch sensor panel according to the second exemplary embodiment includes the plurality of driving electrodes TX, and for example, the plurality of driving electrodes TX may include a $0^{th}$ driving electrode TX0 to a $15^{th}$ driving electrode TX15. Herein, each driving electrode may be disposed to satisfy the following arrangement condition.

The plurality of driving electrodes TX may be arranged to satisfy the following conditions. 1) With respect to one receiving electrode RX, four different driving electrodes are arranged at the left side, and four different driving electrodes are arranged at the right side. 2) With respect to each receiving electrode RX, two facing driving electrodes TX have the same number. 3) Each receiving electrode has a size corresponding to 8 times that of the driving electrode TX. 4) Eight driving electrodes adjacent to the receiving electrode RX1 in the even-numbered row are arranged to be symmetric to eight driving electrodes adjacent to the receiving electrode RX0 in the odd-numbered row.

Referring to FIG. 9B, when one conductive rod of 15 phi is in contact with the touch sensor panel in the state where the touch sensor panel of the second exemplary embodiment is in the floating state, it can be seen that the horizontal split does not appear, through a size of the output touch signal (the final amount of capacitance changed). Like the touch sensor panel according to the first exemplary embodiment, in the touch sensor panel of the second exemplary embodiment, since the two driving electrodes TX adjacent to both sides with respect to each receiving electrode RX have the same characteristic, the part where the LGM signal rapidly increases in the remap process is gone, so that it is expected that the horizontal split is improved.

Third Exemplary Embodiment

FIG. 10A is an enlarged view of only a part of the arrangement structure of driving electrodes and receiving electrodes of a touch sensor panel according to a third exemplary embodiment, and FIG. 10B is an experimental data showing that horizontal split is improved when a conductive rod of 15 phi is in contact with the touch sensor panel in the state where the touch sensor panel illustrated in FIG. 10A is in a floating state.

Referring to FIG. 10A, the touch sensor panel according to the third exemplary embodiment includes the plurality of driving electrodes TX and the plurality of receiving electrodes RX. The plurality of driving electrodes TX and the plurality of receiving electrodes RX are arranged on the same layer in a matrix form.

The plurality of driving electrodes TX and the plurality of receiving electrodes RX may be made of a transparent conductive material (for example, indium tin oxide (ITO) or antimony tin oxide (ATO) made of tin oxide ($SnO_2$) and indium oxide ($In_2O_3$)). However, this is merely an example, and the driving electrode TX and the receiving electrode RX may also be formed of other transparent conductive materials or an opaque conductive material. For example, the driving electrode TX and the receiving electrode RX may include at least one of silver ink, copper, nano silver, and carbon nanotube (CNT).

Further, the driving electrode TX and the receiving electrode RX may be implemented with a metal mesh. When the driving electrode TX and the receiving electrode RX are implemented with the metal mesh, the wires connected to the driving electrode TX and the receiving electrode RX may also be implemented with the metal mesh, and the driving electrode TX and the receiving electrode RX and the wires may also be integrally implemented with the metal mesh. When the driving electrode TX, the receiving electrode RX, and the wire are integrally implemented with the metal mesh, a dead zone, such as between the electrode and the wire and/or between the electrode and another electrode, in which a touch position cannot be detected, is reduced, so that sensitivity of detecting a touch position may be further improved.

The touch sensor panel according to the third exemplary embodiment is arranged with respect to the plurality of receiving electrodes RX. Accordingly, the arrangement structure of the plurality of receiving electrodes RX will be described first, and the arrangement structure of the plurality of driving electrodes TX will be described.

The plurality of receiving electrodes RX is arranged in each of the plurality of columns A1, A2, A3, A4, A5, A6, A7, and A8. Herein, the plurality of driving electrodes TX is arranged in the plurality of columns B1, B2, B3, B4, B5, B6, B7, B8, B9, B10, B11, and B12 formed between the plurality of columns A1, A2, A3, A4, A5, A6, A7, and A8, in which the receiving electrodes RX are arranged, at the external side of the first column A1, and at the external side of the eighth column A8.

With respect to each receiving electrode RX of the plurality of receiving electrodes RX, the two driving electrodes TX adjacent to both sides have the same characteristic. That is, the two driving electrodes TX adjacent to both sides with respect to each receiving electrode RX have the same number. Herein, the meaning that the two driving electrodes TX are the same or that the numbers of the two driving electrodes TX are the same is that the two driving electrodes TX are electrically connected through wires.

The touch sensor panel according to the third exemplary embodiment includes one or more sets in which the plurality of receiving electrodes RX and the plurality of driving electrodes TX are disposed in a predetermined arrangement. The plurality of sets is repeatedly arranged in the row direction and the column direction, so that the touch sensor panel according to the third exemplary embodiment may be formed.

One set may include the plurality of different receiving electrodes RX, and for example, one set may include eight receiving electrodes including a $0^{th}$ receiving electrode RX0 to a seventh receiving electrode RX7. The eight receiving electrodes RX0, RX1, RX2, RX3, RX4, RX5, RX6, and RX7 may be disposed in a predetermined arrangement. The eight receiving electrodes including the $0^{th}$ receiving electrode RX0 to the seventh receiving electrode RX are divided and arranged in the consecutive four columns A1, A2, A3, and A4 in the row direction. Accordingly, in each of the four columns, the two receiving electrodes may be disposed from top to bottom.

The plurality of receiving electrodes having the consecutive numbers is disposed in each column. Herein, the arrangement order of the odd-numbered columns A1 and A3 and the arrangement order of the even-numbered columns A2 and A4 may be opposite to each other. For example, the receiving electrodes RX0 and RX1 having the consecutive numbers are sequentially arranged from top to bottom in the first column A1, the receiving electrodes RX2 and RX3 having the consecutive numbers are sequentially arranged from top to bottom in the second column A2, the receiving electrodes RX4 and RX5 having the consecutive numbers are sequentially arranged from bottom to top in the third column A3, and the receiving electrodes RX6 and RX7 having the consecutive numbers are sequentially arranged from bottom to top in the fourth column A4. Herein, although not illustrated in the drawing, the plurality of different receiving electrodes included in one set may not be sequentially arranged in the row or column direction, but may be arranged randomly.

In the meantime, the touch sensor panel according to the third exemplary embodiment includes the plurality of driving electrodes TX, and for example, the plurality of driving electrodes TX may include a $0^{th}$ driving electrode TX0 to a $15^{th}$ driving electrode TX15. Herein, each driving electrode may be disposed to satisfy the following arrangement condition.

The plurality of driving electrodes TX may be arranged to satisfy the following conditions. 1) With respect to one receiving electrode RX, four different driving electrodes are arranged at the left side, and four different driving electrodes are arranged at the right side. 2) With respect to each receiving electrode RX, two facing driving electrodes TX have the same number. 3) Three driving electrodes having the same number are consecutively arranged in the row direction. 4) Eight driving electrodes adjacent to the receiving electrode RX1 in the even-numbered row are arranged to be symmetric to eight driving electrodes adjacent to the receiving electrode RX0 in the odd-numbered row. 5) A length (horizontal length) of the driving electrodes TX arranged at both edges of each set and the driving electrodes arranged at the center of each set is a half the length (horizontal length) of the other driving electrodes.

Referring to FIG. 10B, when one conductive rod of 15 phi is in contact with the touch sensor panel in the state where the touch sensor panel of the third exemplary embodiment is in the floating state, it can be seen that the horizontal split does not appear, through a size of the output touch signal (the final amount of capacitance changed). Like the touch sensor panel according to the first exemplary embodiment, in the touch sensor panel of the third exemplary embodiment, since the two driving electrodes TX adjacent to both sides with respect to each receiving electrode RX have the same characteristic, the part where the LGM signal rapidly increases in the remap process is gone, so that it is expected that the horizontal split is improved.

Fourth Exemplary Embodiment

Figure 11A:
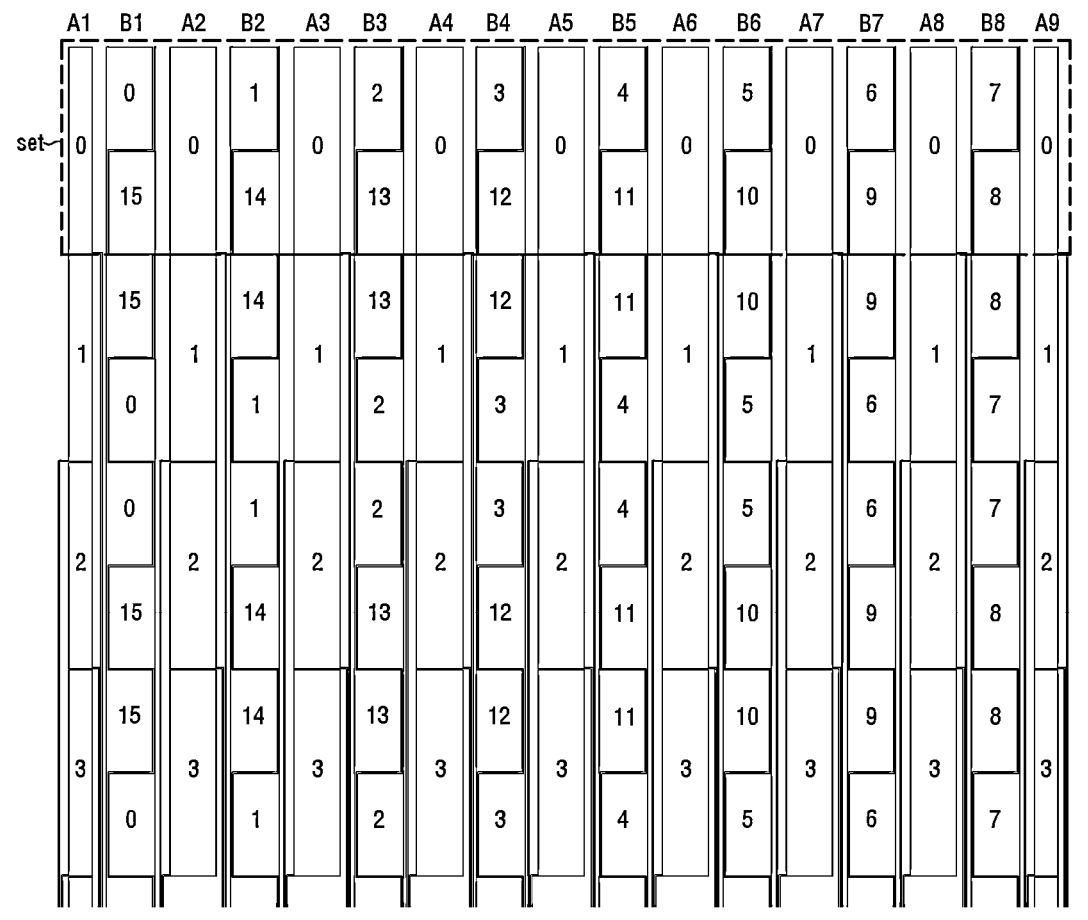
Figure 11B:
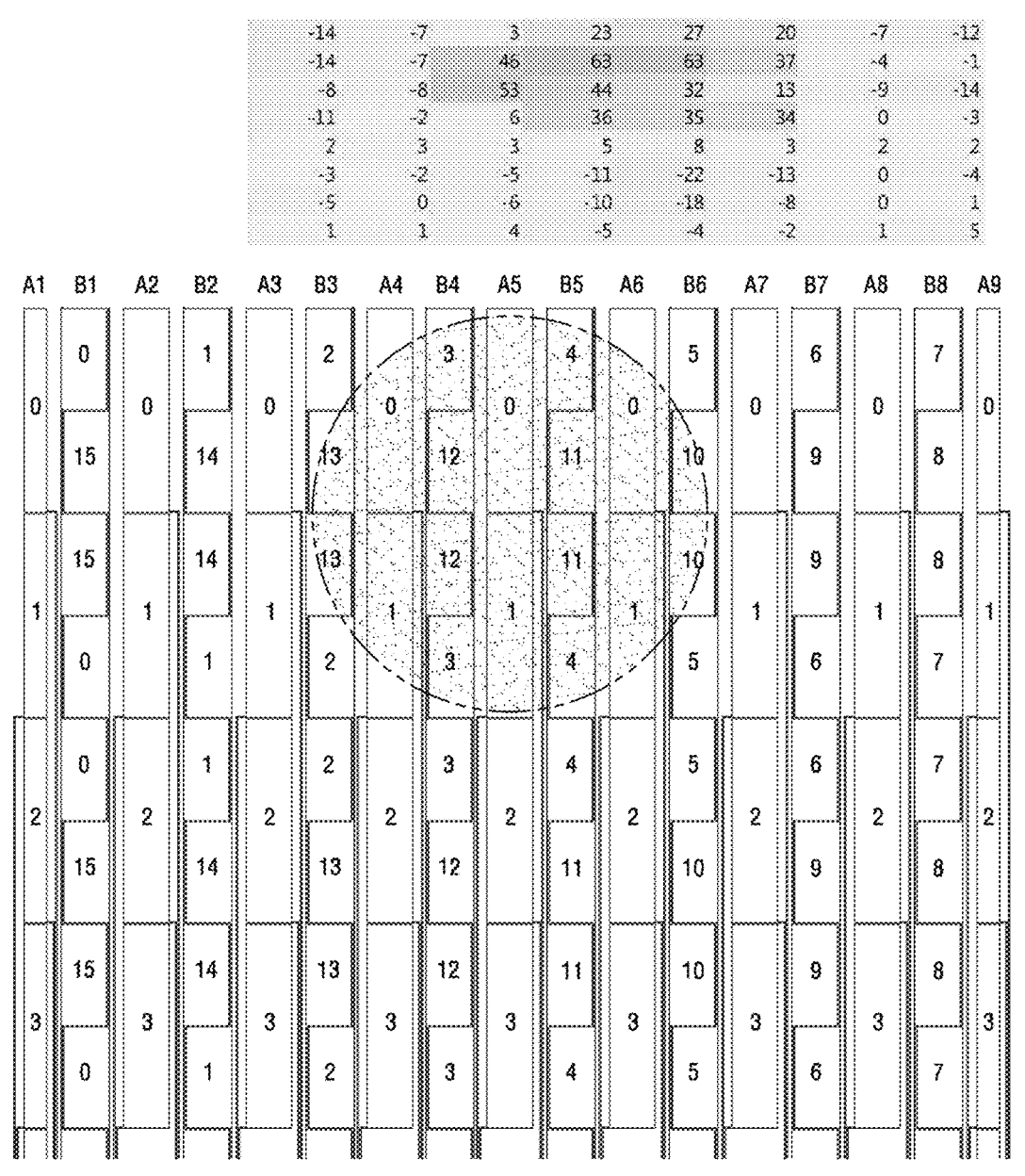

FIG. 11A is an enlarged view of a part of the arrangement structure of driving electrodes and receiving electrodes of a touch sensor panel according to a fourth exemplary embodiment, and FIG. 11B is an experimental data showing that horizontal split is improved when a conductive rod of 15 phi is in contact with the touch sensor panel in the state where the touch sensor panel illustrated in FIG. 11A is in a floating state.

Referring to FIG. 11A, the touch sensor panel according to the fourth exemplary embodiment includes the plurality of driving electrodes TX and the plurality of receiving electrodes RX. The plurality of driving electrodes TX and the plurality of receiving electrodes RX are arranged on the same layer in a matrix form.

The plurality of driving electrodes TX and the plurality of receiving electrodes RX may be made of a transparent conductive material (for example, indium tin oxide (ITO) or antimony tin oxide (ATO) made of tin oxide ($SnO_2$) and indium oxide ($In_2O_3$)). However, this is merely an example, and the driving electrode TX and the receiving electrode RX may also be formed of other transparent conductive materials or an opaque conductive material. For example, the driving electrode TX and the receiving electrode RX may include at least one of silver ink, copper, nano silver, and carbon nanotube (CNT).

Further, the driving electrode TX and the receiving electrode RX may be implemented with a metal mesh. When the driving electrode TX and the receiving electrode RX are implemented with the metal mesh, the wires connected to the driving electrode TX and the receiving electrode RX may also be implemented with the metal mesh, and the driving electrode TX and the receiving electrode RX and the wires may also be integrally implemented with the metal mesh. When the driving electrode TX, the receiving electrode RX, and the wire are integrally implemented with the metal mesh, a dead zone, such as between the electrode and the wire and/or between the electrode and another electrode, in which a touch position cannot be detected, is reduced, so that sensitivity of detecting a touch position may be further improved.

The touch sensor panel according to the fourth exemplary embodiment is arranged with respect to the plurality of receiving electrodes RX. Accordingly, hereinafter, the arrangement structure of the receiving electrodes RX disposed in plural in columns B1 to B8 will be first described, and then the arrangement structure of the plurality of driving electrodes TX will be described.

The plurality of receiving electrodes RX is arranged in each of the plurality of columns B1, B2, B3, B4, B5, B6, B7, and B8. Herein, the plurality of driving electrodes TX is arranged in the plurality of columns A1, A2, A3, A4, A5, A6, A7, A8, and A9 formed between the plurality of columns B1, B2, B3, B4, B5, B6, B7, and B8 in which the receiving electrodes RX are arranged, at the external side of the first column B1, and at the external side of the eighth column B8.

With respect to each receiving electrode RX of the plurality of receiving electrodes RX, the two driving electrodes TX adjacent to both sides have the same characteristic. That is, the two driving electrodes TX adjacent to both sides with respect to each receiving electrode RX have the same number. Herein, the meaning that the two driving electrodes TX are the same or that the numbers of the two driving electrodes TX are the same is that the two driving electrodes TX are electrically connected through wires.

The touch sensor panel according to the fourth exemplary embodiment includes one or more sets in which the plurality of receiving electrodes RX and the plurality of driving electrodes TX are disposed in a predetermined arrangement. The plurality of sets is repeatedly arranged in the column direction, so that the touch sensor panel according to the fourth exemplary embodiment may be formed. However, the receiving electrodes RX of the even-numbered set are disposed to be symmetric to the receiving electrodes of the odd-numbered set.

One set may include the plurality of different receiving electrodes RX, and for example, one set may include 16 receiving electrodes including a $0^{th}$ receiving electrode RX0 to a $15^{th}$ receiving electrode RX15. The 16 receiving electrodes RX0, RX1, RX2, RX3, RX4, RX5, RX6, RX7, RX8, RX9, RX10, RX11, RX12, RX13, RX14, and RX15 may be disposed in a predetermined arrangement. The 16 receiving electrodes including the $0^{th}$ receiving electrode RX0 to the $15^{th}$ receiving electrode RX15 are divided and arranged in two rows consecutive in the column direction. Accordingly, the eight receiving electrodes may be disposed in each of the two rows.

The receiving electrodes numbered from 0 to 7 are arranged from left to right in the order of RX0, RX1, RX2, RX3, RX4, RX5, RX6, and RX7 in a first row, and the receiving electrodes numbered from 8 to 15 are arranged from left to right in the order of RX15, RX14, RX13, RX12, RX11, RX10, RX9, and RX8 in a second row.

In the meantime, the touch sensor panel according to the fourth exemplary embodiment includes the plurality of driving electrodes TX, and for example, the plurality of driving electrodes TX may include a $0^{th}$ driving electrode TX0 to a third driving electrode TX3. Herein, each driving electrode may be disposed to satisfy the following arrangement condition.

The plurality of driving electrodes TX may be arranged to satisfy the following conditions. 1) One driving electrode is disposed at the left side and the right side with respect to two different receiving electrodes RX0 and RX15 consecutive in the column direction. 2) Two facing driving electrodes TX with respect to the two different receiving electrodes RX0 and RX15 consecutive in the column direction have the same number. 3) The driving electrodes TX arranged in the column direction have the different numbers, and the driving electrodes TX arranged in the row direction have the same number. 4) A length (horizontal length) of the driving electrodes arranged at both edges of each set is a half the length (horizontal length) of the other driving electrodes.

Referring to FIG. 11B, when one conductive rod of 15 phi is in contact with the touch sensor panel in the state where the touch sensor panel of the fourth exemplary embodiment is in the floating state, it can be seen that the horizontal split does not appear, through a size of the output touch signal (the final amount of capacitance changed). Like the touch sensor panel according to the first exemplary embodiment, in the touch sensor panel of the fourth exemplary embodiment, since the two driving electrodes TX adjacent to both sides with respect to each receiving electrode RX have the same characteristic, the part where the LGM signal rapidly increases in the remap process is gone, so that it is expected that the horizontal split is improved.

Fifth Exemplary Embodiment

Figure 12A:
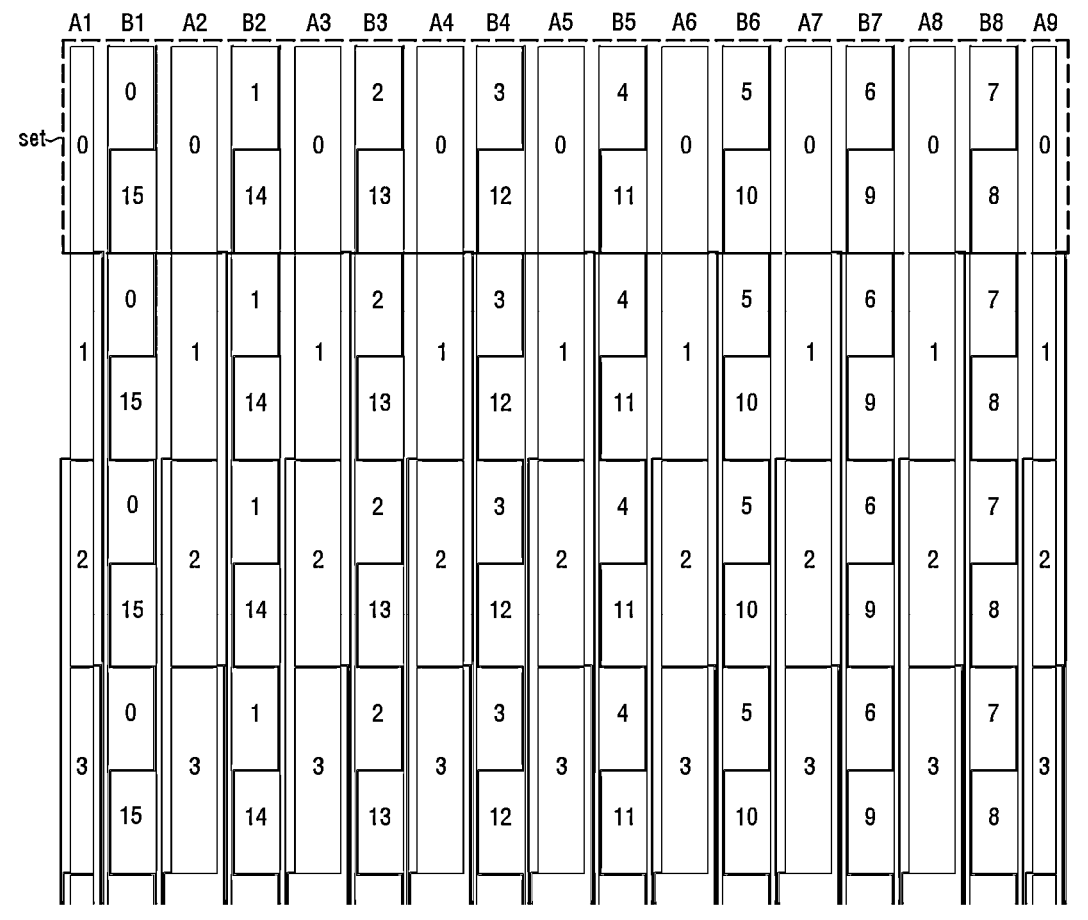
Figure 12B:
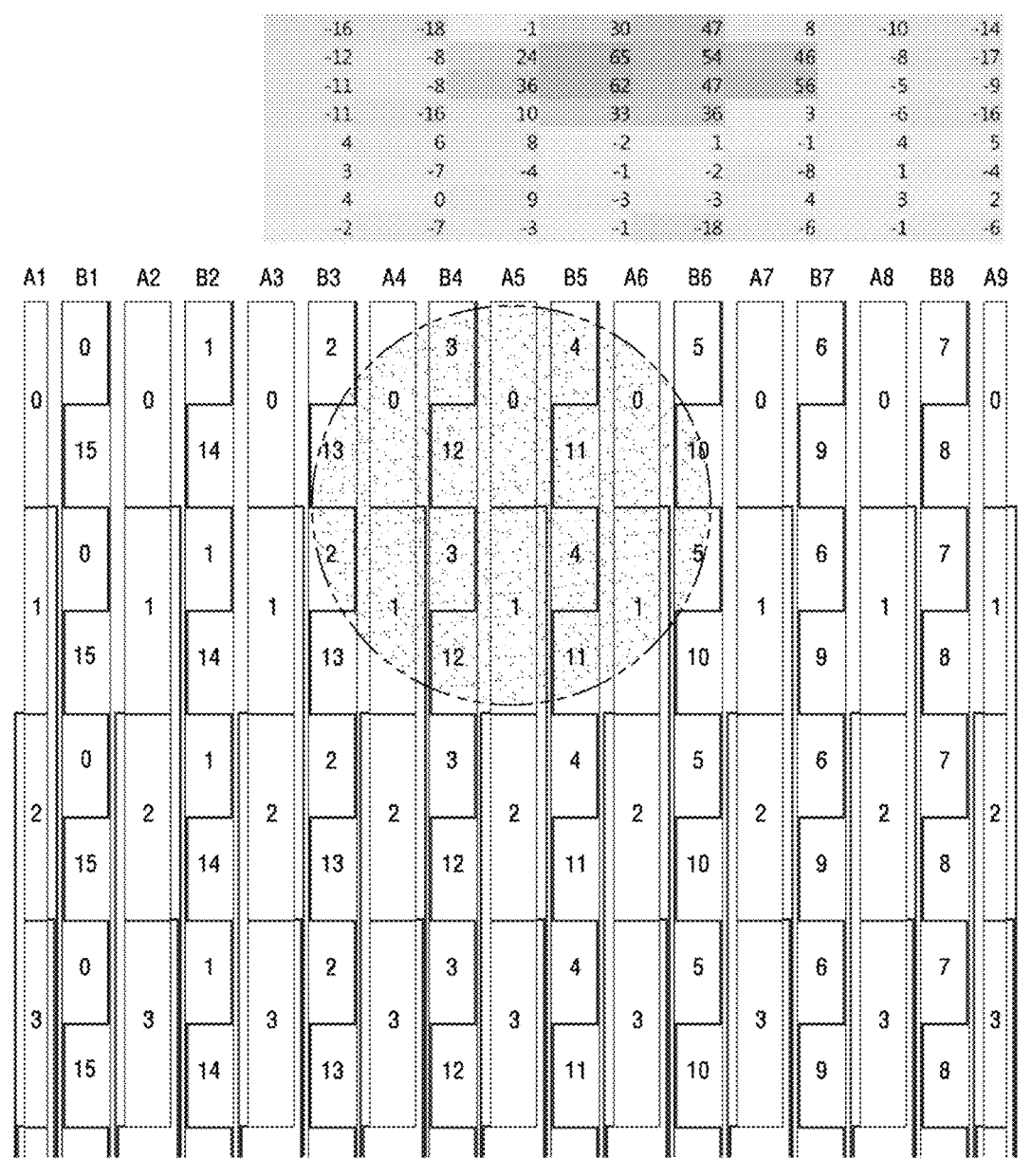

FIG. 12A is an enlarged view of only a part of the arrangement structure of driving electrodes and receiving electrodes of a touch sensor panel according to a fifth exemplary embodiment, and FIG. 12B is an experimental data showing that horizontal split is improved when a conductive rod of 15 phi is in contact with the touch sensor panel in the state where the touch sensor panel illustrated in FIG. 12A is in a floating state.

In the touch sensor panel according to the fifth exemplary embodiment illustrated in FIG. 12A, the arrangement of the receiving electrodes in the even-numbered set is the same as the arrangement of the receiving electrodes in the odd-numbered set, compared to the touch sensor panel according to the fourth exemplary embodiment illustrated in FIG. 11A. That is, the arrangements of the receiving electrodes of all of the sets are the same. Since the rest is the same as the touch sensor panel according to the fourth exemplary embodiment illustrated in FIG. 11A, so that a detailed description of the rest will be omitted.

Referring to FIG. 12B, when one conductive rod of 15 phi is in contact with the touch sensor panel in the state where the touch sensor panel of the fifth exemplary embodiment is in the floating state, it can be seen that the horizontal split does not appear, through a size of the output touch signal (the final amount of capacitance changed).

Sixth Exemplary Embodiment

FIG. 13A is an enlarged view of only a part of the arrangement structure of driving electrodes and receiving electrodes of a touch sensor panel according to a sixth exemplary embodiment, and FIG. 13B is an experimental data showing that horizontal split is improved when a conductive rod of 15 phi is in contact with the touch sensor panel in the state where the touch sensor panel illustrated in FIG. 13A is in a floating state.

Referring to FIG. 13A, the touch sensor panel according to the sixth exemplary embodiment includes the plurality of driving electrodes TX and the plurality of receiving electrodes RX. The plurality of driving electrodes TX and the plurality of receiving electrodes RX are arranged in a matrix form.

The plurality of driving electrodes TX and the plurality of receiving electrodes RX may be made of a transparent conductive material (for example, indium tin oxide (ITO) or antimony tin oxide (ATO) made of tin oxide ($SnO_2$) and indium oxide ($In_2O_3$)). However, this is merely an example, and the driving electrode TX and the receiving electrode RX may also be formed of other transparent conductive materials or an opaque conductive material. For example, the driving electrode TX and the receiving electrode RX may include at least one of silver ink, copper, nano silver, and carbon nanotube (CNT).

Further, the driving electrode TX and the receiving electrode RX may be implemented with a metal mesh. When the driving electrode TX and the receiving electrode RX are implemented with the metal mesh, the wires connected to the driving electrode TX and the receiving electrode RX may also be implemented with the metal mesh, and the driving electrode TX and the receiving electrode RX and the wires may also be integrally implemented with the metal mesh. When the driving electrode TX, the receiving electrode RX, and the wire are integrally implemented with the metal mesh, a dead zone, such as between the electrode and the wire and/or between the electrode and another electrode, in which a touch position cannot be detected, is reduced, so that sensitivity of detecting a touch position may be further improved.

The touch sensor panel according to the sixth exemplary embodiment is arranged with respect to the plurality of driving electrodes TX. Accordingly, hereinafter, the arrangement structure of the driving electrodes TX disposed in plural in columns B1 to B16 will be first described, and then the arrangement structure of the plurality of receiving electrodes RX will be described.

The plurality of driving electrodes TX is arranged in each of the plurality of columns B1, B2, B3, B4, B5, B6, B7, B8, B9, B10, B11, B12, B13, B14, B15, and B16. Herein, the plurality of receiving electrodes RX is arranged in the plurality of columns A1, A2, A3, A4, A5, A6, A7, A8, A9, A10, A11, A12, A13, A14, A15, A16 formed between the plurality of columns B1, B2, B3, B4, B5, B6, B7, B8, B9, B10, B11, B12, B13, B14, B15, and B16, in which the driving electrodes TX are arranged, at the external side of the first column B1, and at the external side of the $16^{th}$ column B16.

With respect to each driving electrode TX of the plurality of driving electrodes TX, the two receiving electrodes RX adjacent to both sides have the different characteristic. That is, the two receiving electrodes RX adjacent to both sides with respect to each driving electrode TX have the different number. Herein, the meaning that the two receiving electrodes RX are different or the two receiving electrodes RX have different numbers is that the receiving electrodes are not electrically connected through wires.

The plurality of driving electrodes TX includes a first set set 1 in which 32 driving electrodes including the $0^{th}$ driving electrode TX0 to the $31^{st}$ driving electrode TX31 are disposed in a first arrangement, and a second set set 2 in which the 32 driving electrodes including the $0^{th}$ driving electrode TX to the $31^{st}$ driving electrode TX31 are disposed in a second arrangement.

The first set set 1 may be provided with two consecutively in the row direction and two in the column direction, and the first set set 1 located in the even-numbered row may be symmetric to the first set set 1 located in the odd-numbered row.

The second set set 2 may be provided with two consecutively in the row direction and two in the column direction, and the second set set 2 located in the even-numbered row may be symmetric to the second set set 2 located in the odd-numbered row.

Further, the plurality of second sets may be disposed at one side of the plurality of first sets.

In the first arrangement of the first set set 1, the 32 driving electrodes including the $0^{th}$ driving electrode TX0 to the $31^{st}$ driving electrode TX31 are divided and arranged in four columns consecutively in the row direction, and in the first column, the driving electrodes numbered from 0 to 7 are arranged from top to bottom in the order of TX0, TX1, TX2, TX3, TX4, TX5, TX6, and TX7, in the second column, the driving electrodes numbered from 8 to 15 are arranged from top to bottom in the order of TX15, TX14, TX13, TX12, TX11, TX10, TX9, and TX8, in the third column, the driving electrodes numbered from 16 to 23 are arranged from top to bottom in the order of TX16, TX17, TX18, TX19, TX20, TX21, TX22, and TX23, and in the fourth column, the driving electrodes numbered from 24 to 31 are arranged from top to bottom in the order of TX31, TX30, TX29, TX28, TX27, TX26, TX25, and TX24.

In the second arrangement of the second set set 2, the 32 driving electrodes including the $0^{th}$ driving electrode TX0 to the $31^{st}$ driving electrode TX31 are divided and arranged in four columns consecutively in the row direction, and in the first column, the driving electrodes numbered from 16 to 23 are arranged from top to bottom in the order of TX16, TX17, TX18, TX19, TX20, TX21, TX22, and TX23, in the second column, the driving electrodes numbered from 24 to 31 are arranged from top to bottom in the order of TX31, TX30, TX29, TX28, TX27, TX26, TX25, and TX24, in the third column, the driving electrodes numbered from 0 to 7 are arranged from top to bottom in the order of TX0, TX1, TX2, TX3, TX4, TX5, TX6, and TX7, and in the fourth column, the driving electrodes numbered from 8 to 15 are arranged from top to bottom in the order of TX15, TX14, TX13, TX12, TX11, TX10, TX9, and TX8.

In the meantime, the touch sensor panel according to the sixth exemplary embodiment includes the plurality of receiving electrodes RX, and for example, the plurality of receiving electrodes RX may include a $0^{th}$ receiving electrode RX0 to a $15^{th}$ receiving electrode RX15. Herein, each receiving electrode may be disposed so as to satisfy the following arrangement condition.

The plurality of receiving electrodes RX are disposed so as to satisfy the following arrangement condition. 1) With respect to the eight different driving electrodes TX consecutive in the column direction, One receiving electrode is disposed at the left side and one receiving electrode is disposed at the right side. 2) With respect to the eight different driving electrodes TX consecutive in the column direction, two facing receiving electrodes RX have different numbers. 3) Two different receiving electrodes RX are arranged in the column direction, and eight different receiving electrodes RX are repeatedly arranged in the row direction. 4) A length (horizontal length) of the receiving electrodes arranged at both edges in the column direction may be a half the length (horizontal length) of the other receiving electrodes as illustrated in FIG. 13B, but is not limited thereto, and a length (horizontal length) of the receiving electrodes arranged at both edges in the column direction may be the same as the length (horizontal length) of the other receiving electrodes as illustrated in FIG. 13A.

Referring to FIG. 13B, when one conductive rod of 15 phi is in contact with the touch sensor panel in the state where the touch sensor panel of the sixth exemplary embodiment is in the floating state, it can be seen that the horizontal split does not appear, through a size of the output touch signal (the final amount of capacitance changed). In the touch sensor panel of the sixth exemplary embodiment, since the two receiving electrodes RX adjacent to both sides with respect to each driving electrode TX have the same characteristic, the specific part where the LGM signal rapidly increases in the remap process is gone, so that it is expected that the horizontal split is improved.

Seventh Exemplary Embodiment

Figure 14A:
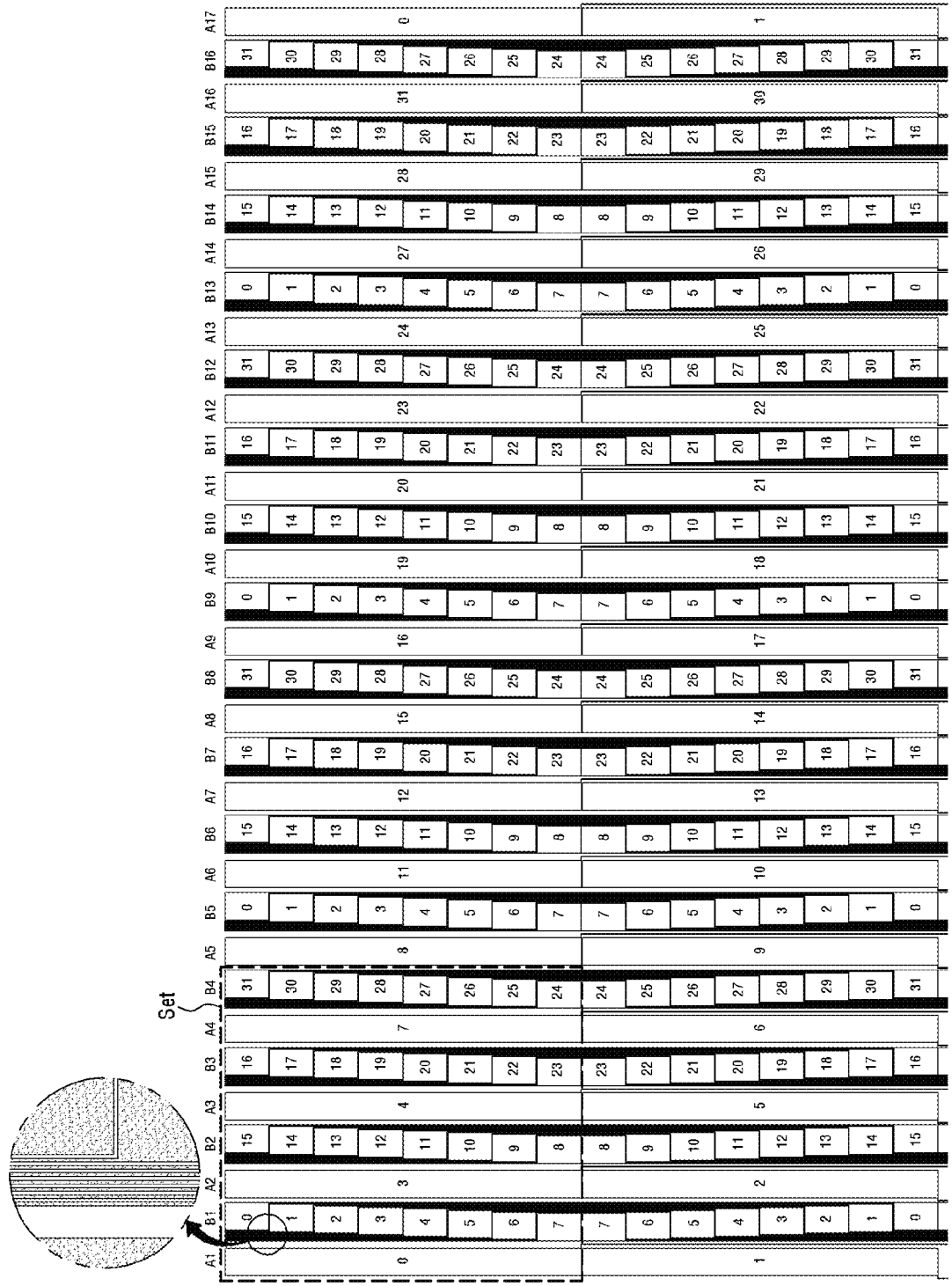
FIG. 14A is an enlarged view of a part of the arrangement structure of driving electrodes and receiving electrodes of a touch sensor panel according to a seventh exemplary embodiment.

FIG. 14A is an enlarged view of a part of the arrangement structure of driving electrodes and receiving electrodes of a touch sensor panel according to a seventh exemplary embodiment, and FIG. 14B is an experimental data showing that horizontal split is improved when a conductive rod of 15 phi is in contact with the touch sensor panel in the state where the touch sensor panel illustrated in FIG. 14A is in a floating state.

Referring to FIG. 14A, the touch sensor panel according to the seventh exemplary embodiment includes the plurality of driving electrodes TX and the plurality of receiving electrodes RX. The plurality of driving electrodes TX and the plurality of receiving electrodes RX are arranged on the same layer in a matrix form.

The plurality of driving electrodes TX and the plurality of receiving electrodes RX may be made of a transparent conductive material (for example, indium tin oxide (ITO) or antimony tin oxide (ATO) made of tin oxide ($SnO_2$) and indium oxide ($In_2O_3$)). However, this is merely an example, and the driving electrode TX and the receiving electrode RX may also be formed of other transparent conductive materials or an opaque conductive material. For example, the driving electrode TX and the receiving electrode RX may include at least one of silver ink, copper, nano silver, and carbon nanotube (CNT).

Further, the driving electrode TX and the receiving electrode RX may be implemented with a metal mesh. When the driving electrode TX and the receiving electrode RX are implemented with the metal mesh, the wires connected to the driving electrode TX and the receiving electrode RX may also be implemented with the metal mesh, and the driving electrode TX and the receiving electrode RX and the wires may also be integrally implemented with the metal mesh. When the driving electrode TX, the receiving electrode RX, and the wire are integrally implemented with the metal mesh, a dead zone, such as between the electrode and the wire and/or between the electrode and another electrode, in which a touch position cannot be detected, is reduced, so that sensitivity of detecting a touch position may be further improved.

The touch sensor panel according to the seventh exemplary embodiment is arranged with respect to the plurality of driving electrodes TX. Accordingly, hereinafter, the arrangement structure of the driving electrodes TX disposed in plural in columns B1 to B16 will be first described, and then the arrangement structure of the plurality of receiving electrodes RX will be described.

The plurality of driving electrodes TX is arranged in each of the plurality of columns B1, B2, B3, B4, B5, B6, B7, B8, B9, B10, B11, B12, B13, B14, B15, and B16. Herein, the plurality of receiving electrodes RX is arranged in the plurality of columns A1, A2, A3, A4, A5, A6, A7, A8, A9, A10, A11, A12, A13, A14, A15, A16 formed between the plurality of columns B1, B2, B3, B4, B5, B6, B7, B8, B9, B10, B11, B12, B13, B14, B15, and B16, in which the driving electrodes TX are arranged, at the external side of the first column B1, and at the external side of the $16^{th}$ column B16.

With respect to each driving electrode TX of the plurality of driving electrodes TX, the two receiving electrodes RX adjacent to both sides have the different characteristic. That is, the two receiving electrodes RX adjacent to both sides with respect to each driving electrode TX have the different number. Herein, the meaning that the two receiving electrodes RX are different or the two receiving electrodes RX have different numbers is that the receiving electrodes are not electrically connected through wires.

The plurality of driving electrodes TX includes a set in which 32 driving electrodes including a $0^{th}$ driving electrode TX0 to a $31^{st}$ driving electrode TX31 are disposed in a first arrangement. Herein, the set may be repeatedly arranged in plural in the row direction and the column direction. The set located in the even-numbered row may be symmetric to the set located in the odd-numbered row.

In the first arrangement of the first set set 1, 32 driving electrodes including a $0^{th}$ driving electrode TX0 to a $31^{st}$ driving electrode TX31 are arranged in four columns consecutively in the row direction, and in the first column, the driving electrodes numbered from 0 to 7 are arranged from top to bottom in the order of TX0, TX1, TX2, TX3, TX4, TX5, TX6, and TX7, in the second column, the driving electrodes numbered from 8 to 15 are arranged from top to bottom in the order of TX15, TX14, TX13, TX12, TX11, TX10, TX9, and TX8, in the third column, the driving electrodes numbered from 16 to 23 are arranged from top to bottom in the order of TX16, TX17, TX18, TX19, TX20, TX21, TX22, and TX23, and in the fourth column, the driving electrodes numbered from 24 to 31 are arranged from top to bottom in the order of TX31, TX30, TX29, TX28, TX27, TX26, TX25, and TX24.

In the meantime, the touch sensor panel according to the seventh exemplary embodiment includes the plurality of receiving electrodes RX, and for example, the plurality of receiving electrodes may include a $0^{th}$ receiving electrode RX0 to a $31^{st}$ receiving electrode RX31. Herein, each receiving electrode may be disposed so as to satisfy the following arrangement condition.

The plurality of receiving electrodes RX is disposed so as to satisfy the following arrangement condition. 1) One receiving electrode is disposed at the left side and one receiving electrode is disposed at the right side with respect to the eight different driving electrodes TX consecutive in the column direction. 2) Two facing receiving electrodes RX have different numbers with respect to the eight different driving electrodes TX consecutive in the column direction. 3) Two different receiving electrodes are arranged in the column direction, and the 16 different receiving electrodes are repeatedly arranged in the row direction. 4) A length (horizontal length) of the receiving electrodes arranged at both edges in the column direction may be a half a length of other receiving electrodes (horizontal length) as illustrated in FIG. 14B, but is not limited thereto, and a length (horizontal length) of the receiving electrodes arranged at both edges in the column direction may be the same as a length of other receiving electrodes (horizontal length) as illustrated in FIG. 14A.

Referring to FIG. 14B, when one conductive rod of 15 phi is in contact with the touch sensor panel in the state where the touch sensor panel of the seventh exemplary embodiment is in the floating state, it can be seen that the horizontal split does not appear, through a size of the output touch signal (the final amount of capacitance changed). Like the touch sensor panel of the seventh exemplary embodiment, even in the touch sensor panel of the seventh exemplary embodiment, since the two receiving electrodes RX adjacent to both sides with respect to each driving electrode TX have the same characteristic, the specific part where the LGM signal rapidly increases in the remap process is gone, so that it is expected that the horizontal split is improved.

Further, the number of receiving electrodes RX of the touch sensor panel of the seventh exemplary embodiment is larger than that of the sixth exemplary embodiment touch sensor panel. Since the number of different reception channels is larger, the touch sensor panel may be less affected by LGM, so that the horizontal split phenomenon may be further improved.

As illustrated in FIGS. 8A to 14B, the touch sensor panels according to the first to seventh exemplary embodiments have an advantage in that a horizontal split phenomenon is improved. This is because in the touch sensor panels illustrated in FIGS. 8A to 14B, two driving electrodes TX adjacent to both sides with respect to each receiving electrode RX are the same or two receiving electrodes RX adjacent to both sides with respect to each driving electrode TX are different from each other.

Herein, it should be noted that in the touch sensor panels illustrated in FIGS. 8A to 14B, the driving electrode and the receiving electrode may be configured in reverse. Accordingly, there is an advantage in that even in the case where two driving electrodes TX adjacent to both sides with respect to each receiving electrode RX are different from each other or two receiving electrodes RX adjacent to both sides with respect to each driving electrode TX are the same, the horizontal split phenomenon is improved.

In the meantime, the touch sensor panel in the related art illustrated in FIG. 2, a "vertical split phenomenon" may occur in the floating state. The vertical split phenomenon will be described in detail with reference to FIGS. 15A-B.

Figure 15B:
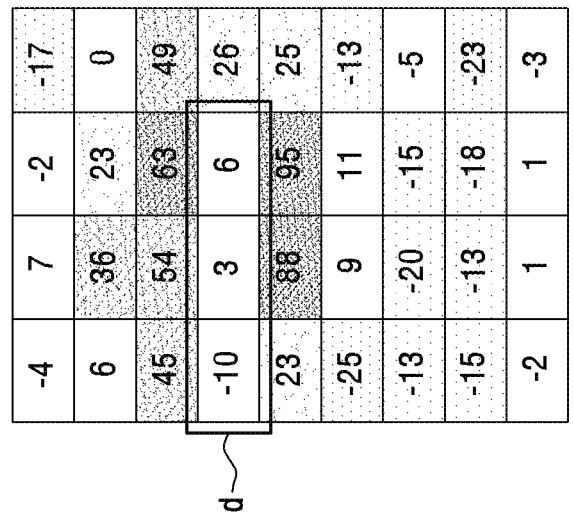
FIGS. 15A-B are diagrams illustrating a vertical split phenomenon of an output touch signal when a part of the touch sensor panel is touched with a finger in the state where a device including the touch sensor panel illustrated in FIG. 2 is floated.
Figure 15A:
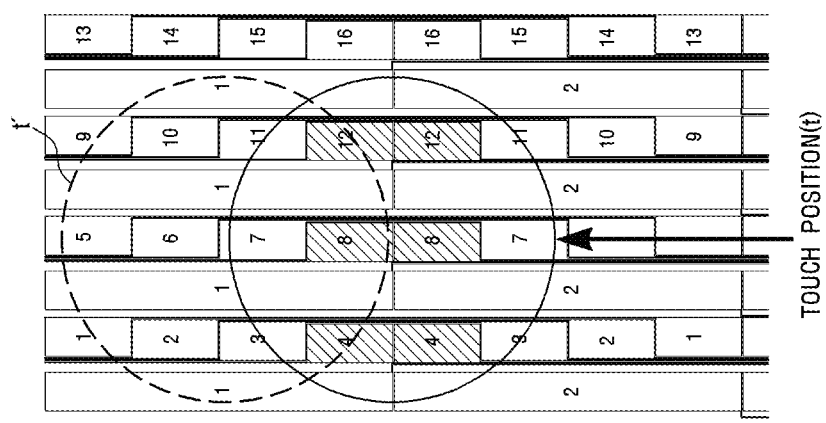

FIGS. 15A-B are diagrams illustrating a vertical split phenomenon of an output touch signal when a part of the touch sensor panel is touched with a finger in the state where the device including the touch sensor panel illustrated in FIG. 2 is floated.

FIG. 15A is an enlarged diagram of a part of the touch sensor panel illustrated in FIG. 2, and illustrates the case where an object (conductive rod) touches a specific part t (touch position), and FIG. 15B is a diagram illustrating an actual output value of a touch signal output after the remap process in the situation illustrated in FIG. 15A.

In the case where a touch of the object is input to the touch position t illustrated in FIG. 15A, a vertical split may occur like a portion "d" of FIG. 15B.

The reason why the vertical split occurs is that the sum of the number of normal touch signals and the number of LGMs at the corresponding touch position t is larger than the sum of the number of normal touch signals and the number of LGMs at a previous touch position t'.

For example, when the driving signal is applied from the eighth driving electrode TX8 at the previous touch position t', the normal touch signal is one capacitance change value (1diff) between the eighth driving electrode TX8 and the first receiving electrode RX1 adjacent to the left side and one capacitance change value (1diff) between the eighth driving electrode TX8 and the first receiving electrode RX1 adjacent to the right side, and a total of two normal touch signals (2diff) are output. In the meantime, the LGM signal is output from each of the four first receiving electrodes RX1, so that the number of LGM signals is four (−4diff). The LGM jamming signal has a sign opposite to that of the normal touch signal, so that the number of final touch signals is 2+(−4), which is −2 (2diff).

In the meantime, when the driving signal is applied from the eighth driving electrode TX8 at the corresponding touch position t, the normal touch signal is one mutual capacitance change value (1diff) between the eighth driving electrode TX8 and the first receiving electrode RX1 adjacent to the left, one mutual capacitance change value (1diff) between the eighth driving electrode TX8 and the first receiving electrode RX1 adjacent to the right, one mutual capacitance change value (1diff) between the eighth driving electrode TX8 and the second receiving electrode RX2 adjacent to the left, and one mutual capacitance change value (1diff) between the eighth driving electrode TX8 and the second receiving electrode RX2 adjacent to the right, so that a total of four normal touch signals (4diff) is output. In the meantime, the LGM signal is output from each of the four first receiving electrodes RX1 and each of the four second receiving electrodes RX2, so that the number of LGM signals is eight (−8diff). The LGM jamming signal has a sign opposite to that of the normal touch signal, so that the number of final touch signals is 4+(−8), which is −4 (4diff).

As described above, compared to the previous touch position t', the LGM signal component rapidly increases in the final touch signal output at the corresponding touch position t, so that the touch signal output after the remap process rapidly decreases as indicated with d in FIG. 15B. Due to the foregoing phenomenon, the vertical split may occur.

Further, another reason why the vertical split occurs may also be that the number of same driving electrodes or/and the number of same receiving electrodes included in the corresponding touch position t is larger than the number of driving electrodes or/and the number of same receiving electrodes included in the previous touch position t'. Herein, an area of the driving electrode or an area of the receiving electrode that is in contact with the corresponding touch position t may also be further considered.

Among the touch sensor panels of the present invention illustrated in FIGS. 8A to 14B, in the touch sensor panel according to the first exemplary embodiment illustrated in FIGS. 8A and 8B, the vertical split occurs at the corresponding touch position t as illustrated in FIG. 16. An actual output value of the touch signal output in the portion in which the vertical split occurs is smaller than a reference value (for example, 65) based on which whether a touch is input is determined, so that it is somewhat difficult to overcome the occurring vertical split phenomenon even with software.

Figure 17:
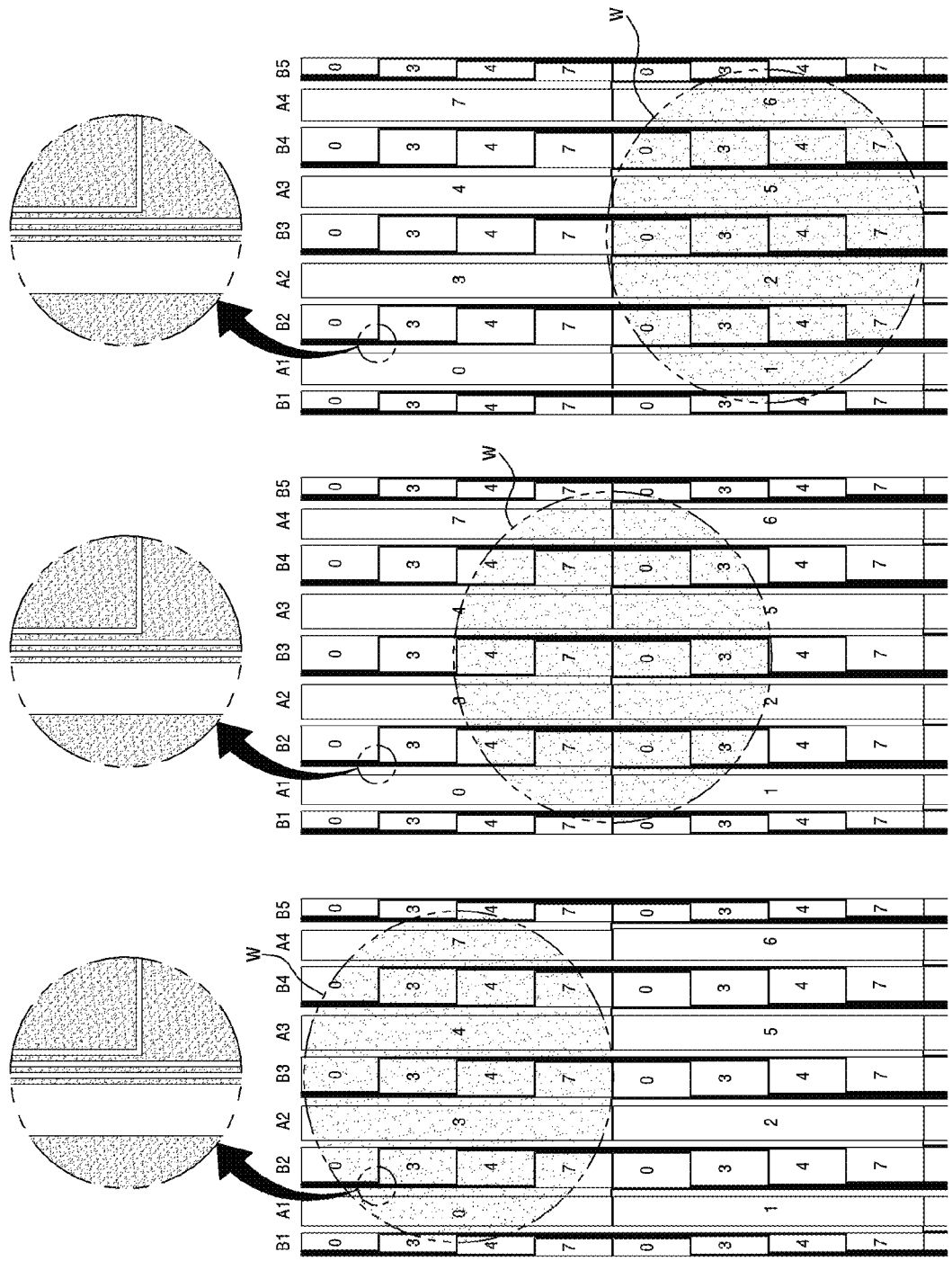
FIG. 17 is a diagram illustrating a touch sensor panel capable of releasing or preventing the vertical split phenomenon.

In order to solve the vertical split phenomenon in the touch sensor panel according to the first exemplary embodiment illustrated in FIGS. 8A and 8B, as illustrated in FIG. 17, in the touch sensor panel according to the exemplary embodiment of the present invention, when a predetermined touch window area w is placed at a certain position on the touch sensor panel, it is desirable to arrange the driving electrodes (or receiving electrodes) so that the same driving electrodes (or receiving electrodes) are not consecutive in the column direction in the touch window area w.

Herein, the touch window area w may mean an area covering the first number of first electrodes consecutive in a first direction among the plurality of first electrodes and the second number of second electrodes consecutive in a second direction with respect to each of the first number of first electrodes. Herein, the first electrode may be any one of the driving electrode and the receiving electrode, and the second electrode may be the remaining one.

Further, the touch window area w may mean an area covering the first electrodes included in a first length among the plurality of first electrodes and the second electrodes included in a second length among the plurality of second electrodes. Herein, the first length and the second length may be the same or may also be different from each other.

For example, in FIG. 17, the touch window area w has a circular shape, and may be 15 phi.

Referring to FIG. 17, even if the touch window area w is moved in any direction on the touch sensor panel, the same driving electrodes are not consecutive in the column direction within the corresponding touch window area w.

More particularly, in order to improve the vertical split, as illustrated in FIG. 17, in the touch sensor panel including the plurality of first electrodes RX0, RX1, RX2, RX3, RX4, RX5, RX6, and RX7 arranged in plural in a first direction (or the row direction) and a second direction (or the column direction) and the plurality of second electrodes TX0, TX3, TX4, and TX7 arranged in plural in the first direction (or the row direction) and the second direction (or the column direction) on the same layer, the plurality of first electrodes includes at least a first-a electrode RX0 and a first-b electrode RX1 arranged in the second direction, the first-a electrode RX0 and the first-b electrode RX1 are connected to independent wires, respectively, and are electrically separated from each other, the plurality of second electrodes includes the plurality of different second-a electrodes TX0, TX3, TX4, and TX7 arranged while being adjacent to the first-a electrode RX0 and the plurality of different second-b electrodes TX0, TX3, TX4, TX7 arranged while being adjacent to the first-b electrode RX1, the second-a electrodes TX0, TX3, TX4, and TX7 are electrically connected with the second-b electrodes TX0, TX3, TX4, TX7 through wires so as to correspond one to one to the second-b electrodes TX0, TX3, TX4, TX7, mutual capacitance is generated between each of the second-a electrodes TX0, TX3, TX4, and TX4 and the first-a electrode RX0, the mutual capacitance is generated between each of the second-b electrodes TX0, TX3, TX4, TX7 and the first-b electrode RX1, the touch window area w is configured to cover the first number of first electrodes RX0, RX3, RX4, and RX7 consecutive in the first direction among the plurality of first electrodes on the touch sensor panel and the second number of second electrodes TX0, TX3, TX4, and TX7 consecutive in the second direction with respect to each of the first number of first electrodes RX0, RX3, RX4, and RX7, and it is desirable that the plurality of second electrodes is arranged to satisfy a condition that the same second electrodes are not consecutively disposed in the second direction in the touch window area w.

More particularly, in order to improve the vertical split, as illustrated in FIG. 17, in the touch sensor panel including the plurality of first electrodes RX0, RX1, RX2, RX3, RX4, RX5, RX6, and RX7 arranged in plural in a first direction (or the row direction) and a second direction (or the column direction) and the plurality of second electrodes TX0, TX3, TX4, and TX7 arranged in plural in the first direction (or the row direction) and the second direction (or the column direction) on the same layer, the plurality of first electrodes includes at least a first-a electrode RX0 and a first-b electrode RX1 arranged in the second direction, the first-a electrode RX0 and the first-b electrode RX1 are connected to independent wires, respectively, and are electrically separated from each other, the plurality of second electrodes includes the plurality of different second-a electrodes TX0, TX3, TX4, and TX7 arranged while being adjacent to the first-a electrode RX0 and the plurality of different second-b electrodes TX0, TX3, TX4, TX7 arranged while being adjacent to the first-b electrode RX1, the second-a electrodes TX0, TX3, TX4, and TX7 are electrically connected with the second-b electrodes TX0, TX3, TX4, TX7 through wires so as to correspond one to one to the second-b electrodes TX0, TX3, TX4, TX7, mutual capacitance is generated between each of the second-a electrodes TX0, TX3, TX4, and TX4 and the first-a electrode RX0, the mutual capacitance is generated between each of the second-b electrodes TX0, TX3, TX4, TX7 and the first-b electrode RX1, the touch window area w is configured to cover the first electrodes RX0, RX3, RX4, and RX7 included in the first length among the plurality of first electrodes on the touch sensor panel and the second electrodes TX0, TX3, TX4, and TX7 included in the second length among the plurality of second electrodes, and it is desirable that the plurality of second electrodes is arranged to satisfy a condition that the same second electrodes are not consecutively disposed in the direction of the second length in the touch window area w.

FIG. 18 is a diagram illustrating modified examples of the touch window area w illustrated in FIG. 17. As illustrated in the left drawing of FIG. 18, a touch window area w1 may have a quadrangular shape. For example, the touch window area w1 may have a square shape. In this case, a length of one side may have a range of 15 mm to 20 mm In the meantime, as illustrated in the right drawing of FIG. 18, a touch window area w2 may have an elliptical shape. A long axis may have a length of 15 mm to 24 mm, and a short axis may have a length of 15 mm to 20 mm.

Figure 19:
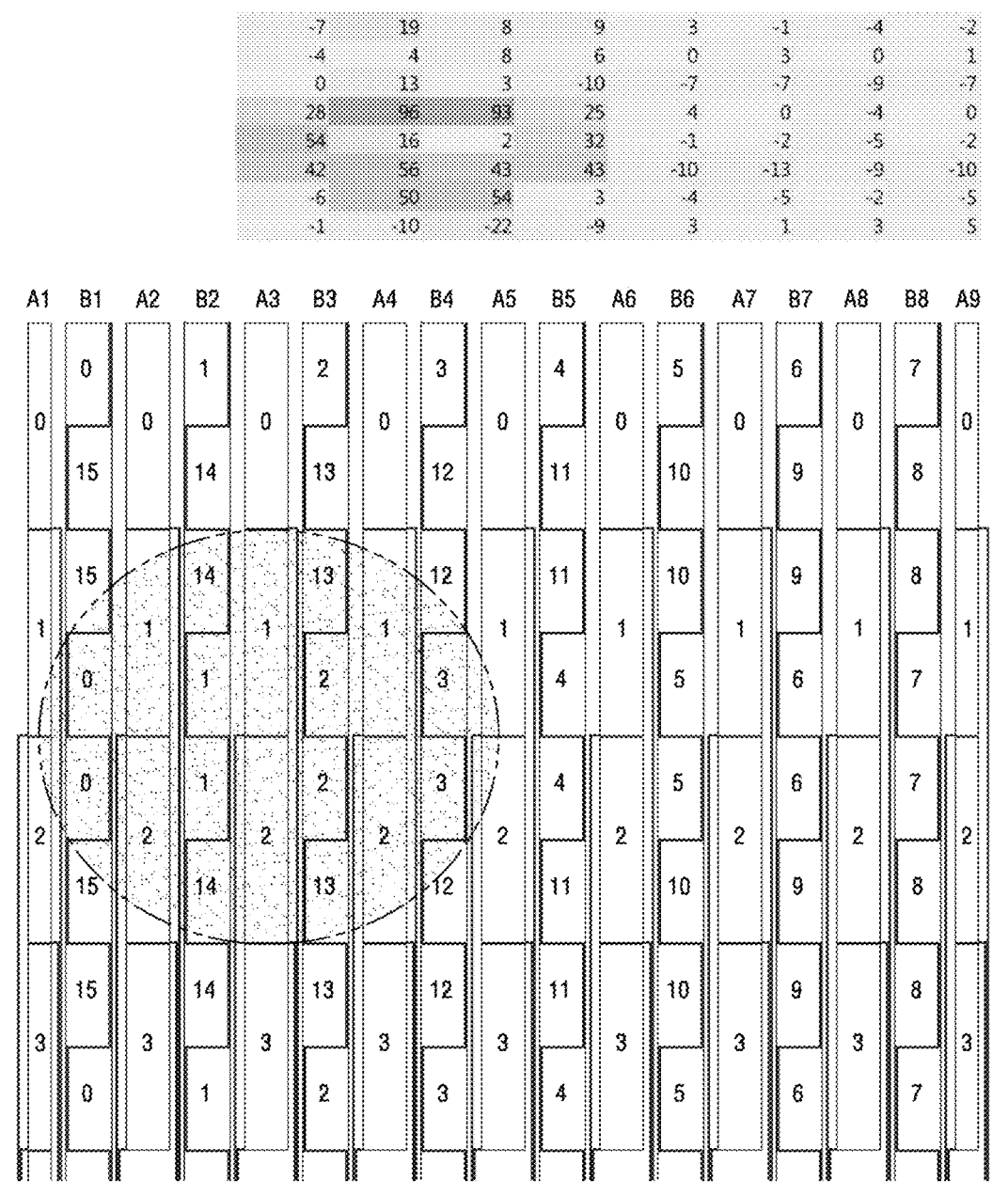

In the meantime, in the touch sensor panel according to the fourth exemplary embodiment illustrated in FIGS. 11A and 11B, the vertical split occurs at the corresponding touch position t as illustrated in FIG. 19. Further, an actual output value of the touch signal output in the portion in which the vertical split occurs is smaller than the reference value (for example, 65) based on which whether a touch is input is determined, so that it is difficult to overcome the occurring vertical split phenomenon with software.

Figure 20:
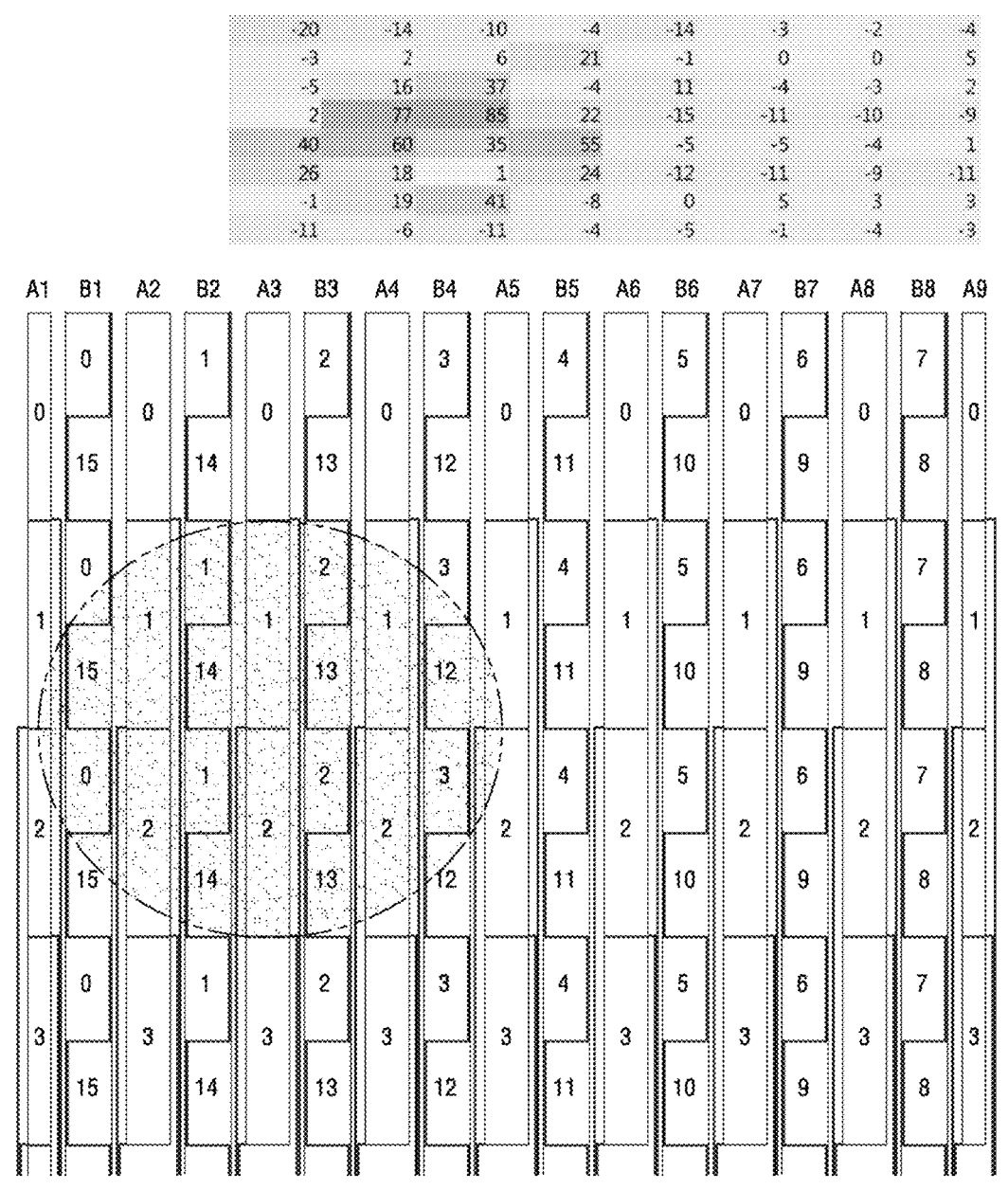

In order to release or prevent the vertical split phenomenon of the touch sensor panel according to the fourth exemplary embodiment illustrated in FIGS. 11A and 11B, the touch sensor panel may have the disposition in which the same receiving electrodes are not consecutive in the column direction within the touch window area w, like the touch sensor panel according to the fifth exemplary embodiment illustrated in FIGS. 12A and 12B. However, in the touch sensor panel according to the fifth exemplary embodiment illustrated in FIGS. 12A and 12B, the vertical split occurs at the corresponding touch position t like FIG. 20.

The reason why the vertical split phenomenon occurs in the touch sensor panel according to the fifth exemplary embodiment illustrated in FIGS. 12A and 12B like the touch sensor panel according to the fifth exemplary embodiment illustrated in FIGS. 11A and 11B is that the number of receiving electrodes RX adjacent to one driving electrode TX is two, which is small, compared to the case of FIG. 17 (the four driving electrodes TX are disposed while being adjacent to one receiving electrode RX). Particularly, as the size of the touch window area increases, the vertical split phenomenon becomes more severe.

Accordingly, in order to release or prevent the vertical split phenomenon, it is desirable to add a condition that the number of other receiving electrodes (or driving electrodes) adjacent to one driving electrode (or receiving electrode) is at least two or more, in addition to the condition that the same receiving electrodes are not consecutive in the column direction within the corresponding touch window area w even though the touch window area w is moved.

In the meantime, the vertical split phenomenon occurs even in the touch sensor panel according to the second exemplary embodiment illustrated in FIGS. 9A and 9B, the touch sensor panel according to the third exemplary embodiment illustrated in FIGS. 10A and 10B, the touch sensor panel according to the sixth exemplary embodiment illustrated in FIGS. 13A and 13B, and the touch sensor panel according to the seventh exemplary embodiment illustrated in FIGS. 14A and 14B, but the actual output value of the touch signal output after the remap process is equal to or larger than the reference value based on which whether the touch is input is determined, so that it is possible to overcome the vertical split phenomenon with software SW. As a matter of course, even in the case of the touch sensor panel according to the second exemplary embodiment illustrated in FIGS. 9A and 9B, the touch sensor panel according to the third exemplary embodiment illustrated in FIGS. 10A and 10B, the touch sensor panel according to the sixth exemplary embodiment illustrated in FIGS. 13A and 13B, and the touch sensor panel according to the seventh exemplary embodiment illustrated in FIGS. 14A and 14B, when the same driving electrodes are not consecutively disposed in the column direction within the touch window area w, it is expected to further release or prevent the vertical split phenomenon.

In the meantime, in the touch sensor panel according to the second exemplary embodiment illustrated in FIGS. 9A and 9B, the touch sensor panel according to the third exemplary embodiment illustrated in FIGS. 10A and 10B, the touch sensor panel according to the sixth exemplary embodiment illustrated in FIGS. 13A and 13B, and the touch sensor panel according to the seventh exemplary embodiment illustrated in FIGS. 14A and 14B in the floating state, the actual output value of the touch signal output after the remap process is equal to or larger than the reference value based on which whether the touch is input is determined, and this is due to the reduced LGM jamming signal compared to the touch sensor panel according to the second exemplary embodiment, the touch sensor panel according to the third exemplary embodiment, the touch sensor panel according to the sixth exemplary embodiment, and the touch sensor panel according to the seventh exemplary embodiment. Hereinafter, this will be described in detail with reference to FIGS. 21A-F.

Figures 21A, 21B, 21C, 21D, 21E, 21F:
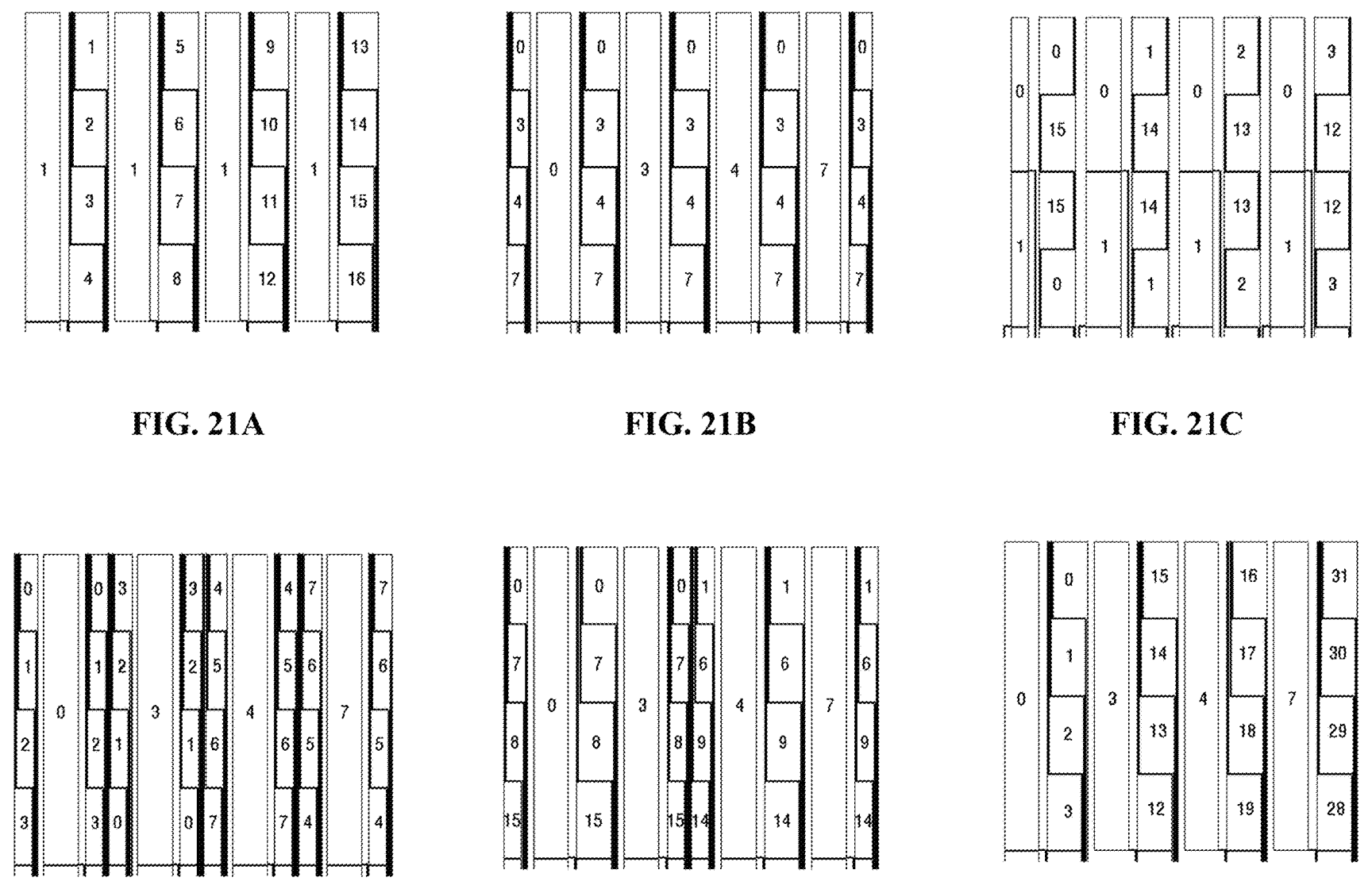

FIG. 21A is a portion covered by a touch window area having a predetermined size in the touch sensor panel in the related art illustrated in FIG. 2, FIG. 21B is a portion covered by the touch window area having the predetermined size in the touch sensor panel according to the first exemplary embodiment illustrated in FIG. 8A, FIG. 21C is a portion covered by the touch window area having the predetermined size in the touch sensor panel according to the fourth exemplary embodiment illustrated in FIG. 11A, FIG. 21D is a portion covered by the touch window area having the predetermined size in the touch sensor panel according to the second exemplary embodiment illustrated in FIG. 9A, FIG. 21E is a portion covered by the touch window area having the predetermined size in the touch sensor panel according to the third exemplary embodiment illustrated in FIG. 10A, and FIG. 21F is portions covered by the touch window areas having the predetermined size in the touch sensor panels according to the sixth and seventh exemplary embodiments illustrated in FIGS. 13A and 14A.

In FIGS. 21A-F, the touch window area having the predetermined size may be defined as a larger area than a touch area of the other fingers, like a touch area of a thumb. In particular, the predetermined size (or area) of the touch window area may be implemented to be about 15 mm×15 mm or more and about 20 mm×20 mm or less, but preferably, may be implemented with a size of about 16 mm×16 mm.

In FIGS. 21A-F, when a result value obtained by multiplying the number of unit cells configuring the same driving electrodes TX the number of unit cells configuring the same receiving electrodes RX disposed in the touch window area is minimized, it is possible to reduce the effect of the LGM jamming signal. Herein, an area of one unit cell may be defined as 4 mm×2 mm.

In FIG. 21A, the number of unit cells configuring the same driving electrodes TX disposed in the touch window area is 1 and the number of unit cells configuring the same receiving electrodes RX is 16, so that the result value of multiplying the numbers is 16.

In FIG. 21B, the number of unit cells configuring the same driving electrodes TX disposed in the touch window area is 4 and the number of unit cells configuring the same receiving electrodes RX is 4, so that the result value of multiplying the numbers is 16.

In FIG. 21C, the number of unit cells configuring the same driving electrodes TX disposed in the touch window area is 8 and the number of unit cells configuring the same receiving electrodes RX is 2, so that the result value of multiplying the numbers is 16.

In the meantime, in FIG. 21D, the number of unit cells configuring the same driving electrodes TX disposed in the touch window area is 2 and the number of unit cells configuring the same receiving electrodes RX is 4, so that the result value of multiplying the numbers is 8.

In FIG. 21E, the number of unit cells configuring the same driving electrodes TX disposed in the touch window area is 2 and the number of unit cells configuring the same receiving electrodes RX is 4, so that the result value of multiplying the numbers is 8.

In FIG. 21F, the number of unit cells configuring the same driving electrodes TX disposed in the touch window area is 1 and the number of unit cells configuring the same receiving electrodes RX is 4, so that the result value of multiplying the numbers is 4. Herein, in the case FIG. 21F, the two receiving electrodes RX0 and RX3 located at both sides of one driving electrode TX0 are different from each other, and four LGM signals are included in each of the receiving electrodes RX0 and RX3, so that the final result value after the remap process is 8.

In the cases of FIGS. 21A-C, the result value of the multiplication of the number of unit cells configuring the same driving electrodes TX and the number of unit cells configuring the same receiving electrodes RX disposed in the touch window area is 16, but in the cases of FIGS. 21D-F, the result value of the multiplication of the number of unit cells configuring the same driving electrodes TX and the number of unit cells configuring the same receiving electrodes RX disposed in the touch window area is 8, which was reduced by ½. When the result value is decrease, the size of the LGM signal is also decreased by ½. As a result, the effect of the LGM jamming signal is reduced by decreasing the number of same driving electrodes and/or the same receiving electrodes included in the touch window area, and simultaneously minimizing the result value of the multiplication of the number of unit cells configuring the same driving electrodes TX and the number of unit cells configuring the same receiving electrodes RX disposed in the touch window area to less than 16 (predetermined value). However, the predetermined value (16) is merely an example of the present invention, and the scope of the present invention is not limited thereto, and the predetermined value may be defined with various numerical values.

The aforementioned characteristic, structure, effect, and the like described in the exemplary embodiments are included in one exemplary embodiment of the present invention, and are not essentially limited to only one exemplary embodiment. Further, the characteristic, structure, effect, and the like described in each exemplary embodiment may be carried out in other exemplary embodiments through combination or modification by those skilled in the art to which the exemplary embodiments pertain. Accordingly, it shall be construed that contents relating to the combination and the modification are included in the scope of the present invention.

In addition, although the exemplary embodiments have been described above, these are only examples, and do not limit the present invention, and those skilled in the art will know that various modifications and applications which are not exemplified above are possible within the scope without departing from the essential characteristics of the present exemplary embodiment. For example, each component specifically presented in the exemplary embodiment may be modified and implemented. Further, it should be interpreted that the differences in relation to the modification and the application are included in the scope of the present invention defined in the accompanying claims.

The invention claimed is:

1. A touch sensor panel in which a plurality of driving electrodes and a plurality of receiving electrodes are arranged on the same layer, wherein
    the plurality of receiving electrodes is arranged along a plurality of rows and columns,
    the plurality of driving electrodes is arranged such that at least one driving electrode is disposed at each of both sides with respect to each receiving electrode, and
    the driving electrode arranged at the left side and the driving electrode arranged at the right side with the receiving electrode interposed therebetween are electrically connected with each other,
    with respect to the receiving electrode, at least three different driving electrodes are arranged in the column direction at the left side, and at least three different driving electrodes are arranged in the column direction at the right side,
    the touch sensor panel includes at least one set,
    in the set, the plurality of receiving electrodes connected to different wires is arranged in each of four columns consecutive in the row direction,
    with respect to each of the plurality of receiving electrodes connected to the different wires, at least four driving electrodes connected to another different wires are arranged in the left column and the at least four driving electrodes connected to the another different wires are arranged in the right column, and
    eight driving electrodes directly adjacent to at least one receiving electrode located in at least one even-numbered row among the plurality of receiving electrodes connected to the different wires are arranged to be symmetric to eight driving electrodes directly adjacent to at least one receiving electrode located in at least one odd-numbered row among the plurality of receiving electrodes connected to the different wires.

2. The touch sensor panel of claim 1, wherein in the set, a horizontal length of the driving electrodes arranged at both edges in the column direction is half a horizontal length of the remaining driving electrodes.

3. The touch sensor panel of claim 1, wherein in the set, the plurality of driving electrodes has the same size, and the one receiving electrode has a size corresponding to 8 times that of any of the driving electrodes.

4. The touch sensor panel of claim 1, wherein in the set, a horizontal length of the driving electrodes arranged at both edges in the column direction and the driving electrodes arranged at the center in the column direction is half a horizontal length of the remaining driving electrodes.

5. The touch sensor panel of claim 1, wherein with respect to two receiving electrodes which are consecutive in a column direction and are connected to different wires, one driving electrode is arranged at the left side and one driving electrode is arranged at the right side, and
    the one driving electrode arranged at the left side and the one driving electrode arranged at the right side are electrically connected with each other.

6. The touch sensor panel of claim 5, wherein the touch sensor panel includes at least one set, and
    in the set, two receiving electrodes connected to different wires are arranged in plural in each of two rows consecutive in the column direction,
    with respect to each of the two receiving electrodes connected to the different wires, one driving electrode is arranged at a left column and one driving electrode is arranged in a right column, the driving electrodes arranged in the column direction are connected to different wires, and the driving electrodes arranged in the row direction are electrically connected with each other, and two receiving electrodes connected to different wires in another set disposed under the set are disposed to be symmetric to the two receiving electrodes connected to the different wires in the set.

7. The touch sensor panel of claim 5, wherein the touch sensor panel includes at least one set, and in the set, two receiving electrodes connected to different wires are arranged in plural in each of two rows consecutive in the column direction, with respect to each of the two receiving electrodes connected to the different wires, one driving electrode is arranged in the left column and one driving electrode is arranged in the right column, and the driving electrodes arranged in the column direction are connected to different wires, and the driving electrodes arranged in the row direction are electrically connected with each other, and two receiving electrodes connected to different wires in another set disposed under the set are disposed in the same order as the order of the two receiving electrodes connected to the different wires in the set.

8. The touch sensor panel of claim 1, wherein a touch window area is configured to cover a first number of receiving electrodes consecutive in a first direction among the plurality of receiving electrodes on the touch sensor panel and a second number of driving electrodes consecutive in a second direction with respect to each of the first number of receiving electrodes, and the plurality of driving electrodes is disposed such that the same driving electrodes are not consecutive in the second direction in the touch window area.

9. The touch sensor panel of claim 1, wherein a touch window area is configured to cover the receiving electrodes included in a first length among the plurality of receiving electrodes and the driving electrodes included in a second length among the plurality of driving electrodes on the touch sensor panel, and the plurality of driving electrodes is disposed such that the same driving electrodes are not consecutive in a direction of the second length in the touch window area.

10. A touch sensor panel including a plurality of first electrodes arranged in plural in a first direction and a second direction and a plurality of second electrodes arranged in plural in the first direction and the second direction on the same layer, wherein the plurality of first electrodes includes at least a first-a electrode and a first-b electrode arranged in the second direction, the first-a electrode and the first-b electrode are connected to different wires, respectively, and are electrically separated from each other, the plurality of second electrodes includes a plurality of different second-a electrodes arranged to be directly adjacent to the first-a electrode and is arranged to be symmetric to a plurality of different second-b electrodes arranged to be directly adjacent to the first-b electrode, the second-a electrodes are electrically connected with the second-b electrodes through wires so as to correspond one to one to the second-b electrodes, mutual capacitance is generated between each of the second-a electrodes and the first-a electrode, and mutual capacitance is generated between each of the second-b electrodes and the first-b electrode, a touch window area is configured to cover a first number of first electrodes consecutive in the first direction among the plurality of first electrodes and a second number of second electrodes consecutive in the second direction with respect to each of the first number of first electrodes on the touch sensor panel, and the plurality of second electrodes is arranged so as to satisfy a condition in which the same second electrodes are not consecutively disposed in the second direction in the touch window area.

11. A touch sensor panel including a plurality of first electrodes arranged in plural in a first direction and a second direction and a plurality of second electrodes arranged in plural in the first direction and the second direction on the same layer, wherein the plurality of first electrodes includes at least a first-a electrode and a first-b electrode arranged in the second direction, the first-a electrode and the first-b electrode are connected to different wires, respectively, and are electrically separated from each other, the plurality of second electrodes includes a plurality of different second-a electrodes arranged to be directly adjacent to the first-a electrode and is arranged to be symmetric to a plurality of different second-b electrodes arranged to be directly adjacent to the first-b electrode, the second-a electrodes are electrically connected with the second-b electrodes through wires so as to correspond one to one to the second-b electrodes, mutual capacitance is generated between each of the second-a electrodes and the first-a electrode, and mutual capacitance is generated between each of the second-b electrodes and the first-b electrode, a touch window area is configured to cover first electrodes included in a first length among the plurality of first electrodes and second electrodes included in a second length among the plurality of second electrodes on the touch sensor panel, and the plurality of second electrodes is arranged so as to satisfy a condition in which the same second electrodes are not consecutively disposed in a direction of the second length in the touch window area.

12. The touch sensor panel of claim 10, wherein each of the number of the second-a electrodes and the number of second-b electrodes are at least three.

13. The touch sensor panel of claim 11, wherein each of the number of the second-a electrodes and the number of second-b electrodes are at least three.

* * * * *